(12) United States Patent
Yang et al.

(10) Patent No.: US 9,483,226 B2
(45) Date of Patent: Nov. 1, 2016

(54) SYSTEM AND METHOD OF SHARING OBJECT BASED ON KNOCKING INPUT

(71) Applicant: Samsung Electronics Co., Ltd., Suwon-si, Gyeonggi-do (KR)

(72) Inventors: Pil-seung Yang, Seoul (KR); Chan-hong Min, Yongin-si (KR); Young-ah Seong, Seoul (KR); Say Jang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/486,376

(22) Filed: Sep. 15, 2014

(65) Prior Publication Data

US 2015/0084894 A1 Mar. 26, 2015

(30) Foreign Application Priority Data

Sep. 24, 2013 (KR) .......................... 10-2013-0113476

(51) Int. Cl.
*G06F 3/14* (2006.01)
*G06F 3/041* (2006.01)
*H04L 29/08* (2006.01)
*G06F 3/0487* (2013.01)
*G06F 3/0486* (2013.01)

(52) U.S. Cl.
CPC ............. *G06F 3/1438* (2013.01); *G06F 3/041* (2013.01); *G06F 3/0486* (2013.01); *G06F 3/0487* (2013.01); *H04L 67/06* (2013.01); *G06F 3/1454* (2013.01); *G06F 2200/1636* (2013.01)

(58) Field of Classification Search
CPC .. G06F 3/1438; G06F 3/0486; G06F 3/0487; H04L 67/06
See application file for complete search history.

(56) References Cited

U.S. PATENT DOCUMENTS

| | | |
|---|---|---|
| 2006/0031779 A1 | 2/2006 | Theurer et al. |
| 2010/0257449 A1 | 10/2010 | Lieb et al. |
| 2011/0271211 A1 | 11/2011 | Jones et al. |
| 2012/0235925 A1 | 9/2012 | Migos et al. |
| 2012/0317108 A1 | 12/2012 | Okazaki et al. |

FOREIGN PATENT DOCUMENTS

EP 2 660 680 A1 11/2013

*Primary Examiner* — Shaheda Abdin
(74) *Attorney, Agent, or Firm* — Jefferson IP Law, LLP

(57) ABSTRACT

A system and method of sharing an object based on a knocking input are provided. The method includes detecting a knocking input on sharing device, determining at least one object displayed on a screen of the sharing device based on the knocking input, and determining at least one counterpart device to share at least one object with, and sharing the at least one object with the at least one counterpart device, wherein the at least one object displayed on the screen of the sharing device is also displayed on a screen of the at least one counterpart device after being synchronized.

29 Claims, 22 Drawing Sheets

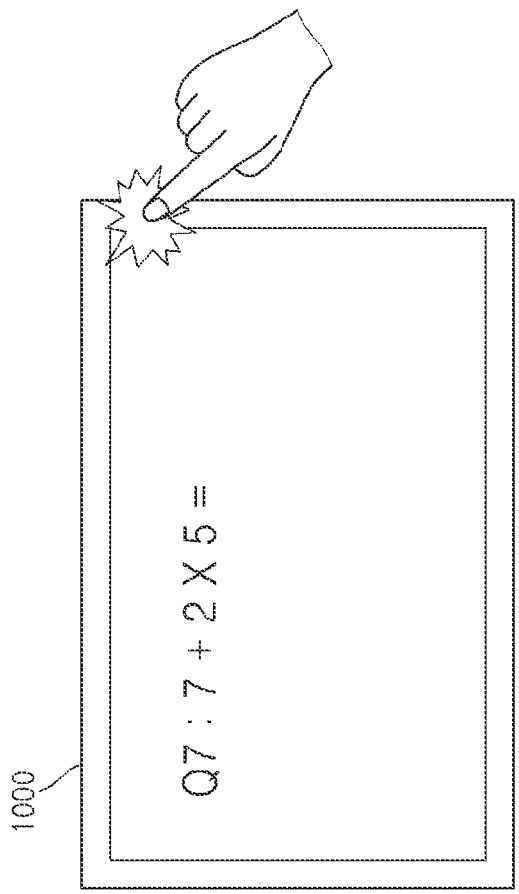
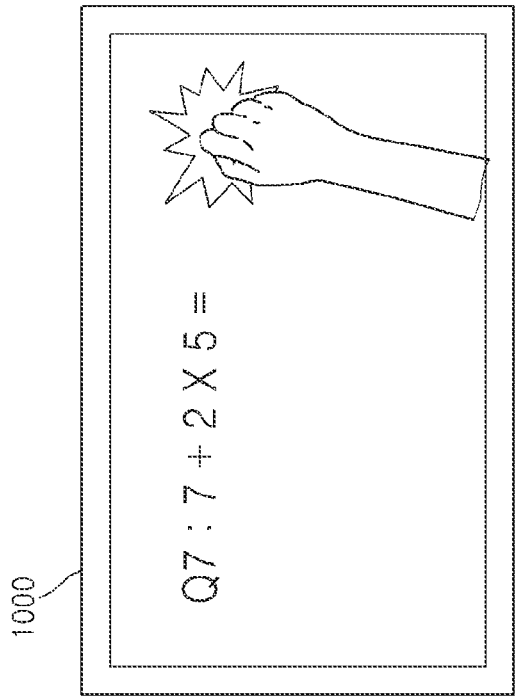

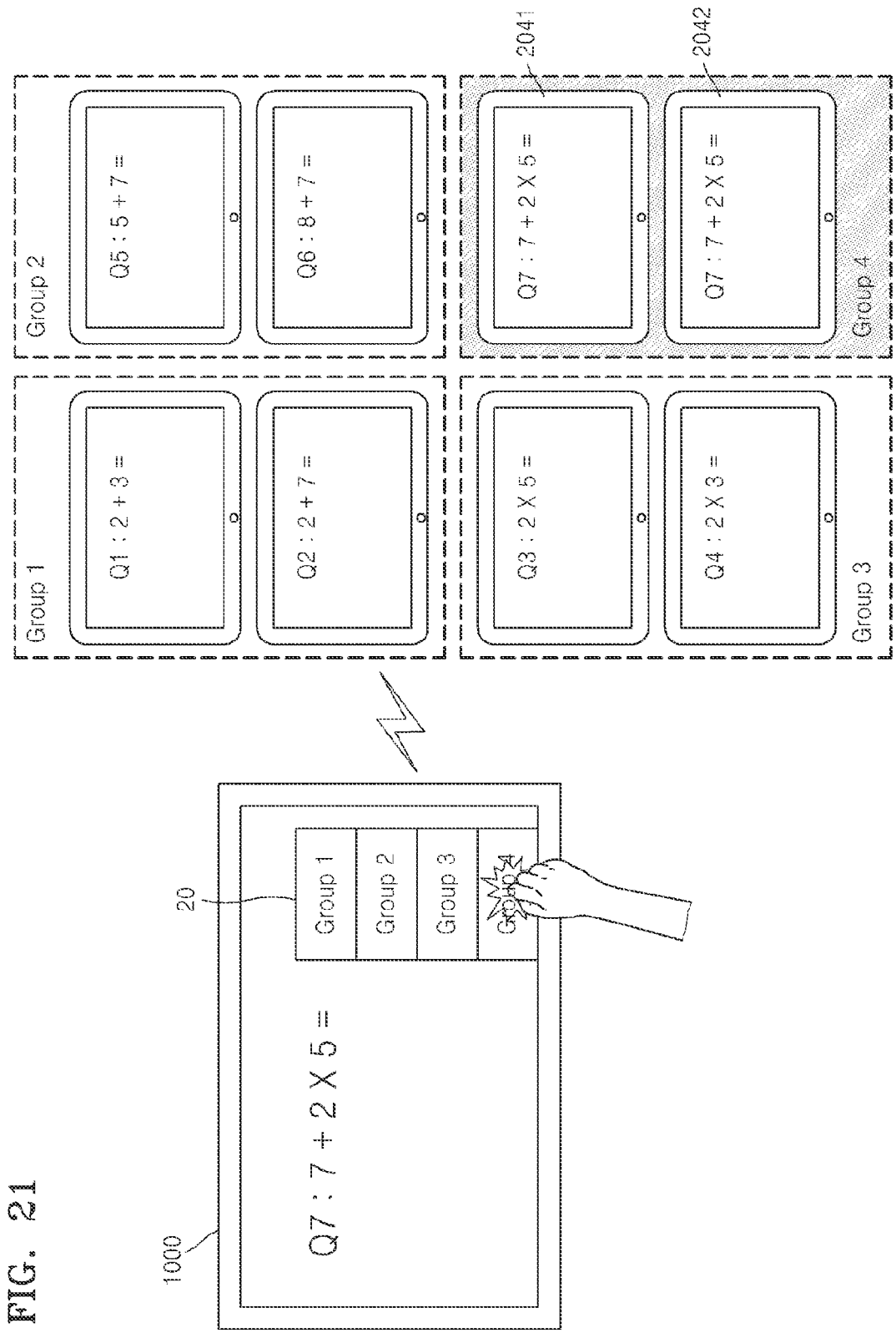

SYSTEM AND METHOD OF SHARING OBJECT BASED ON KNOCKING INPUT

CROSS-REFERENCE TO RELATED APPLICATION(S)

This application claims the benefit under 35 U.S.C. §119 (a) of a Korean patent application filed on Sep. 24, 2013 in the Korean Intellectual Property Office and assigned Serial number 10-2013-0113476, the entire disclosure of which is hereby incorporated by reference.

TECHNICAL FIELD

The present disclosure relates to a system and method of sharing objects between a device and a counterpart device based on a knocking input to the device.

BACKGROUND

As multimedia technologies and network technologies have developed, a presenter and audience members may communicate with each other by using various devices while a presentation is conducted in schools and companies. Accordingly, the presenter may use a sharing device having a large screen when giving a presentation, during which the audience members use devices of their own to check content displayed on the device of the presenter, and at the same time, other content that the audience members need to identify.

However, while the audience members manipulate their own devices, the presenter may not effectively provide the devices of the audience members with the content displayed on the device of the presenter.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a system and method of sharing and synchronizing objects between a sharing device and a counterpart device based on a knocking input.

Additional aspects will be set forth in part in the description which follows and, in part, will be apparent from the description, or may be learned by practice of the presented embodiments.

In accordance with an aspect of the present disclosure, a method of sharing an object by using a sharing device, based on a knocking input is provided. The method includes detecting a knocking input on the sharing device, determining at least one object displayed on a screen of the sharing device, based on the knocking input, and determining at least one counterpart device to share the at least one object with, and sharing the at least one object with the at least one counterpart device, wherein the at least one object displayed on the screen of the device is also displayed on a screen of the at least one counterpart device after being synchronized.

The method may further include determining a pattern of the knocking input, wherein the sharing of the at least one object may include transmitting a control signal for sharing the at least one object from the device to the at least one counterpart device and synchronizing the at least one object based on the pattern of the knocking input.

The sharing of the at least one object may include transmitting a control signal for synchronizing the object to the at least one counterpart device when the pattern of the knocking input is a first pattern.

The sharing of the at least one object may include transmitting a control signal for synchronizing the object and a control signal which causes the at least one counterpart device to output a predetermined notification sound to the at least one counterpart device when the pattern of the knocking input is a second pattern.

The method may further include determining an intensity of the knocking input, wherein a control authority of a screen of the at least one counterpart device according to a user input to the at least one counterpart device may be changed according to the intensity of the knocking input.

The sharing of the at least one object may include transmitting to the at least one counterpart device a control signal for suspending a screen control of the at least one counterpart device according to the user input to the at least one counterpart device for a predetermined time period when the intensity of the knocking input is a first certain value or greater.

The sharing of the at least one object may include transmitting to the at least one counterpart device a control signal which causes the at least one counterpart device to output a predetermined notification sound when the intensity of the knocking input is a second certain value or greater.

The sharing of the at least one object may include transmitting to the at least one counterpart device from the sharing device a control signal for deactivating a display function of the at least one counterpart device for a predetermined time period when the intensity of the knocking input is a third certain value or greater.

The method may further include determining a location of the knocking input, wherein the determining of the at least one counterpart device may include determining at least one counterpart device included in a device group that is matched with the location.

The method may further include detecting a touch input for a predetermined time period after the detecting of the knocking input, wherein the determining of the at least one object may include determining at least one object to be shared with the at least one counterpart device based on the touch input.

The detecting of the knocking input may include detecting the knocking input based on at least one of a pressure applied to the screen of the device by the knocking input, a pressure applied to a bezel of the device by the knocking input, sound generated by the knocking input, and vibration generated by the knocking input.

The detecting of the knocking input may include receiving a knocking input signal detected by a predetermined input device from the predetermined input device.

The sharing of the at least one object may include transmitting at least one of link information for downloading the at least one object and the object to the at least one counterpart device.

The sharing of the at least one object may include transmitting synchronization information for synchronizing the at least one object to the at least one counterpart device.

Content that is displayed on a screen of the at least one counterpart device may be shared and synchronized with the sharing device, based on a knocking input to the at least one counterpart device.

In accordance with another aspect of the present disclosure, a sharing device configured to share an object based on a knocking input is provided. The sharing device includes a user input unit configured to detect the knocking input to the device, a display unit configured to display at least one object, and a controller configured to determine at least one object that is displayed on the display unit based on the knocking input, to determine at least one counterpart device to share the at least one object with, and to share the at least one object with the at least one counterpart device, wherein the determined at least one object is synchronized and displayed on a screen of the sharing device and a screen of the at least one counterpart device.

The controller may determine a pattern of the knocking input, and transmit a control signal to the at least one counterpart device for sharing the at least one object and synchronizing the at least one object based on the pattern of the knocking input.

The controller may transmit a control signal for synchronizing the object to the at least one counterpart device when the pattern of the knocking input is a first pattern.

The controller may transmit a control signal for synchronizing the object and a control signal for allowing the at least one counterpart device to output a predetermined notification sound to the at least one counterpart device when the pattern of the knocking input is a second pattern.

The controller may determine an intensity of the knocking input, and a control authority of a screen of the at least one counterpart device according to a user input to the at least one counterpart device may be changed according to the intensity of the knocking input.

The controller may transmit to the at least one counterpart device a control signal for suspending a screen control of the at least one counterpart device according to the user input to the at least one counterpart device for a predetermined time period, when the intensity of the knocking input is a first certain value or greater.

The controller may transmit to the at least one counterpart device a control signal which causes the at least one counterpart device to output a predetermined notification sound when the intensity of the knocking input is a second certain value or greater.

The controller may transmit to the at least one counterpart device a control signal for deactivating a display function of the at least one counterpart device for a predetermined time period when the intensity of the knocking input is a third certain value or greater.

The controller may determine a location of the knocking input, and determine the at least one counterpart device included in a device group that is matched with the location of the knocking input.

The user input unit may detect a touch input for a predetermined time period after the detecting of the knocking input, and the controller may determine at least one object to be shared with the at least one counterpart device based on the touch input.

The user input unit may sense the knocking input based on at least one of a pressure applied to the screen of the device by the knocking input, a pressure applied to a bezel of the device by the knocking input, sound generated by the knocking input, and vibration generated by the knocking input.

The device may further include a communication unit for receiving a knocking input signal sensed by an input device from the input device.

The controller may transmit at least one of link information for downloading the at least one object and the object to the at least one counterpart device.

The controller may transmit synchronization information for synchronizing the at least one object to the at least one counterpart device.

Content that is displayed on a screen of the at least one counterpart device may be shared and synchronized with the device, based on a knocking input to the at least one counterpart device.

In accordance with another aspect of the present disclosure, a non-transitory computer-readable recording medium having embodied thereon a program, which when executed by the computer, may perform the above method is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 7A and 7B are diagrams demonstrating a knocking input to a device according to an embodiment of the present disclosure;

FIG. 21 is a diagram illustrating an example of determining a counterpart device with which to share an object based on a list of counterpart device groups that are displayed on a screen of a device according to an embodiment of the present disclosure;

Throughout the drawings, it should be noted that like reference numbers are used to depict the same or similar elements, features, and structures.

DETAILED DESCRIPTION

Figure 1:
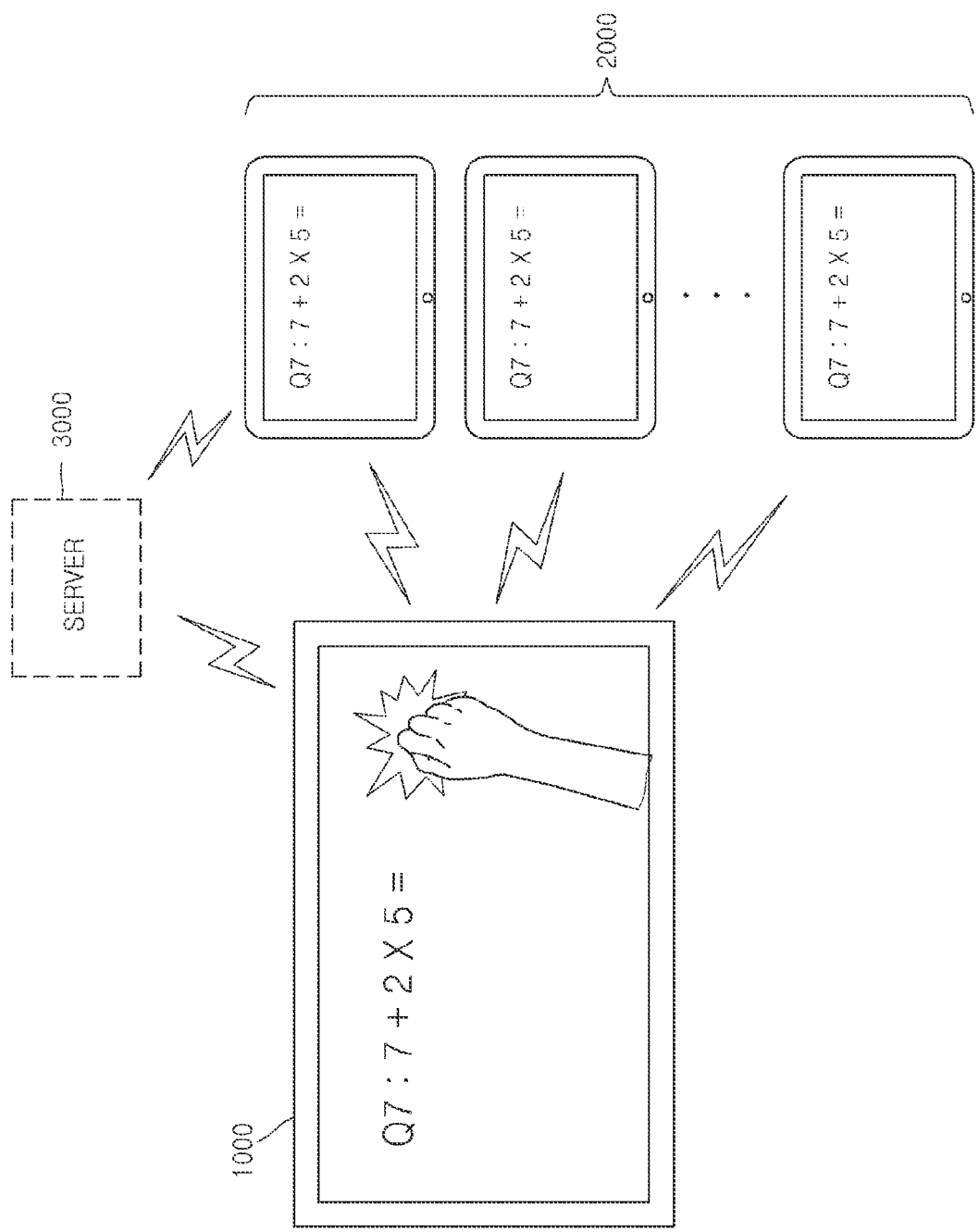
FIG. 1 is a diagram of an object sharing system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that when an element is referred to as being "connected to" or "coupled to" another element, it may be "directly connected or coupled" to the other element, or "electrically connected to" the other element with intervening elements therebetween. It will be further understood that the terms "comprises", "comprising", "includes", and/or "including" when used herein, specify the presence of components, but do not preclude the presence or addition of one or more other components, unless otherwise specified. As used herein, the term "and/or" includes any and all combinations of one or more of the associated listed items. Expressions such as "at least one of," when preceding a list of elements, modify the entire list of elements and do not modify the individual elements of the list.

In the present specification, a knocking input may be an input generated when a user knocks on a device or a periphery of the device. The device may detect at least one of force applied to the device due to the knocking by the user, vibration generated by the knocking by the user, and sound generated by the knocking by the user. The user may knock on a screen or a bezel of the device. The bezel of the device may be a side portion of the device, for example, a boundary of the device. Also, when the user knocks on the device or the periphery of the device with a force that is equal to or greater than a predetermined certain value, the device may detect the knocking input.

Also, in the present specification, an object may be an image, a video, a text, or the like displayed on a screen of a mobile device. Also, an object may include a combination of at least two of the image, the video, and the text displayed on the screen of the mobile device. An object may include, for example, a user interface, an execution result of an application, an execution result of content, a list of contents, and icons; however, in the various embodiments of the present disclosure, an object is not limited thereto.

Hereinafter, various embodiments of the present disclosure will be described with reference to accompanying drawings.

FIG. 1 is a diagram of an object sharing system according to an embodiment of the present disclosure.

Referring to FIG. 1, an object sharing system according to embodiments of the present disclosure may include a device 1000 and at least one counterpart device 2000. Also, the object sharing system may include a server 3000.

When the device 1000 detects a knocking input to the device 1000, an object displayed on a screen of the device 1000 may be displayed on a screen of the counterpart device 2000.

In an embodiment of the object sharing system, the device 1000 may detect a knocking input to the device 1000 or to the periphery of the device 1000, and may determine a pattern of the knocking input, an intensity of the knocking input, and a location of the knocking input. Further, the device 1000 may determine an object that is to be shared with the counterpart device 2000 from among objects displayed on the screen of the device 1000 based on a determination result of the knocking input pattern, and may determine the counterpart device 2000 that will share the determined object. Further, the device 1000 may change a control authority of a screen of the counterpart device 2000 based on the determination result of the knocking input pattern.

The determined object to be shared may be provided to the counterpart device 2000 from the device 1000, or may be provided to the counterpart device 2000 from the server 3000. The determined object may be displayed on the screen of the device 1000 and the screen of the counterpart device 2000, respectively, and may be synchronized.

For example, the device 1000 may be an electronic blackboard that a teacher may use in a classroom, and the counterpart device 2000 may be a tablet PC that each student uses. The server 3000 may provide educational content. In this case, the teacher might knock on the electronic blackboard or a periphery of the electronic blackboard so that educational content displayed on the electronic blackboard may be displayed on tablet PCs of the students. The educational content displayed on the electronic blackboard and the educational content displayed on the tablet PC may be synchronized with each other, and students' authority for controlling the tablet PCs may be restricted by the knocking input of the teacher.

However, various embodiments of the present disclosure are not limited thereto. That is, the device 1000 and the counterpart device 2000 may be various kinds of devices having a communication function and a content display function. For example, the device 1000 and the counterpart device 2000 may respectively be smartphones, smart TVs, mobile phones, Personal Digital Assistants (PDAs), laptop computers, media players, micro servers, global positioning system (GPS) devices, electronic book terminals, digital broadcasting terminals, navigation systems, kiosks, MP3 players, digital cameras, and other mobile or non-mobile computing devices. The device 1000 and the counterpart device 2000 may include various devices that may receive a touch input such as an electronic blackboard, a table with a touch surface, etc.

The device 1000 and the counterpart device 2000 may be directly connected to each other for a short range communication. In addition, the device 1000 and the counterpart device 2000 may be connected to each other via a predetermined Access Point (AP). However, various embodiments of the present disclosure are not limited thereto.

Figure 2:
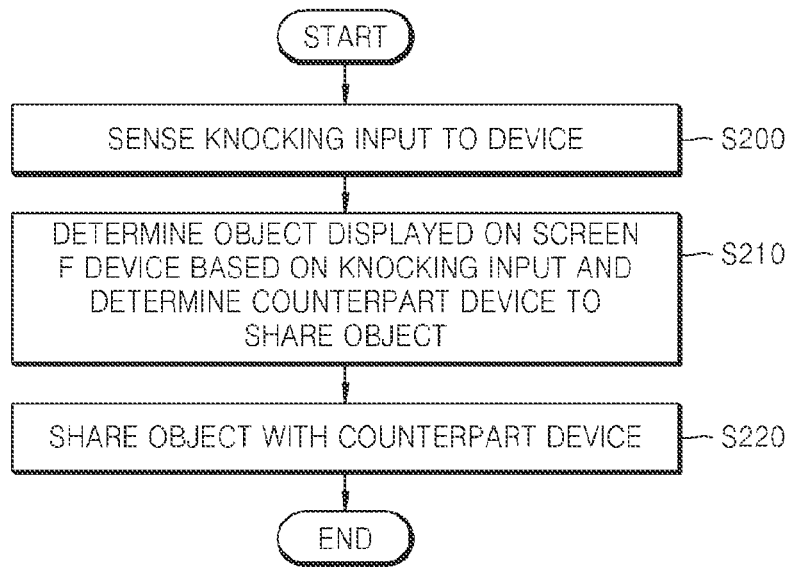
FIG. 2 is a flowchart illustrating a method of sharing an object by a device with a counterpart device based on a knocking input according to an embodiment of the present disclosure.

FIG. 2 is a flowchart illustrating a method of sharing an object by the device 1000 with the counterpart device 2000 based on a knocking input according to an embodiment of the present disclosure.

Referring to FIG. 2, in operation 5200, the device 1000 detects a knocking input to the device 1000. The device 1000 may detect a knocking input on a screen of the device 1000 or a knocking input on a bezel of the device 1000. The device 1000 may detect the knocking input on the screen of the device 1000 by using at least one of a touch sensor, a pressure sensor, a vibration sensor, and a microphone. The device 1000 may determine whether the screen of the device 1000 is knocked on by using a touch sensor and a pressure sensor disposed in the screen of the device 1000. Also, the device 1000 may determine whether the bezel of the device 1000 is knocked on by using a touch sensor and a pressure sensor disposed in the bezel of the device 1000. Also, the device 1000 may sense vibration generated when the device 1000 or the bezel of the device 1000 is knocked on by using the vibration sensor. Otherwise, the device 1000 may detect sound generated when the device 1000 or the bezel of the device 1000 is knocked on by using, for example, the microphone.

The device 1000 may detect the knocking input on a periphery of the device 1000. The device 1000 may detect vibration generated when the periphery of the device 1000 is knocked on by using the vibration sensor. In addition, the device 1000 may detect sound generated when the periphery of the device 1000 is knocked on by using, for example, the microphone.

In addition, if a user knocks on the periphery of the device 1000 by using an additional input device (not shown), the device 1000 may receive a knocking input signal from the input device. For example, the input device may detect whether a wall surface around the device 1000 is knocked on by the input device by using an internal sensor of the input device, and the input device may transmit a knocking input signal to the device 1000. Also, the input device may transmit a knocking input signal to the counterpart device 2000. In this case, the input device may be connected to the device 1000 and the counterpart device 2000 via a short range communication network, Near Field Communication (NFC), Bluetooth, or the like; however, various embodiments of the present disclosure are not limited thereto.

In addition, the device 1000 may determine a pattern, an intensity, and a location of the knocking input. The pattern of the knocking input may be determined by, for example, the number of knocks and the knocking interval. Also, the location of the knocking input may include, for example, a knocking location on the screen of the device 1000, a knocking location on the bezel, and a knocked location on a peripheral region around the device 1000. However, various embodiments of the present disclosure are not limited thereto.

In operation S210, the device 1000 determines an object displayed on the screen of the device 1000 based on the knocking input, and determines the counterpart device 2000 with which the determined object is shared.

The device 1000 may determine the object to be shared with the counterpart device from among the objects displayed on the screen of the device 1000, based on at least one of the pattern of the knocking input, the intensity of the knocking input, and the location of the knocking input. For example, if the user knocks on the screen of the device 1000 with a force of a predetermined value or greater, or if the user knocks on the screen of the device 1000 a predetermined number of times or greater, the device 1000 may determine that all of the objects displayed on the screen of the device 1000 are to be shared with the counterpart device 2000. Also, the device 1000 may determine an object displayed at the knocked location on the screen of the device 1000 as the object to be shared with the counterpart device 2000 from among the objects displayed on the screen of the device 1000. However, various embodiments of the present disclosure are not limited thereto.

The device 1000 may determine the counterpart device 2000 with which the determined object is to be shared based on at least one of the pattern of the knocking input, the intensity of the knocking input, and the location of the knocking input. The device 1000 may determine to share the object with a counterpart device 2000 included in a device group corresponding to the knocking location. For example, if the user knocks on a lower bezel of the device 1000, the device 1000 may determine to share the object with a counterpart device 2000 that is included in a group 4 corresponding to that location. For example, if the user knocks on an upper bezel of the device 1000, the device 1000 may determine to share the object with a counterpart device 2000 included in a group 2. However, various embodiments of the present disclosure are not limited thereto.

In addition, the device 1000 may change a screen control authority of the counterpart device 2000 based on at least one of the pattern of the knocking input, the intensity of the knocking input, and the location of the knocking input. For example, when the screen of the device 1000 is knocked on with a force that is equal to or greater than a preset value, control of the counterpart device 2000 by a user of the counterpart device 2000 may temporarily be disabled. For example, if the screen of the device 1000 is knocked on with a predetermined pattern of knocks, the screen of the counterpart device 2000 may be turned off. However, various embodiments of the present disclosure are not limited thereto.

The device 1000 may determine some of the counterpart devices 2000 connected thereto as devices with which to share the object. However, various embodiments of the present disclosure are not limited thereto. The device 1000 determines the counterpart device 2000 with which to share the object based on a list of the counterpart devices 2000, and may be connected to the determined counterpart device 2000.

In operation S220, the device 1000 shares the object with the counterpart device 2000. The device 1000 may transmit at least one of link information for downloading the determined object, an identification value of the determined object, and the determined object, to the counterpart device 2000. The device 1000 may transmit synchronization information about the determined object to the counterpart device 2000 in order to synchronize the determined object displayed on the device 1000 with an object displayed on the counterpart device 2000. The synchronization information may enable the displaying the object that is displayed on the screen of the device 1000 on the screen of the counterpart device 2000 at the same time. For example, if the object is text or an image, the synchronization information may include a location of displaying the object in the screen of the device 1000, and a size of a region where the object is displayed. For example, if the object is a video, the synchronization information may include information about a current playback position of the video. Also, for example, if the object is a document file, the synchronization information may include information about a current page in the document file. However, various embodiments of the present disclosure are not limited thereto.

In a case where the device 1000 transmits link information for downloading the determined object to the counterpart device 2000, the counterpart device 2000 may download or stream the determined object from the server 3000 by using the link information. In a case where the device 1000 transmits the determined object to the counterpart device 2000, the counterpart device 2000 may download or stream the determined object from the device 1000. In a case where the device 1000 transmits an identification value of the determined object to the counterpart device 2000, the counterpart device 2000 may acquire the determined object from a memory in the counterpart device 2000 or from the server 3000 by using the identification value of the determined object, and display the object.

In addition, the device 1000 may display a ratio of the counterpart devices 2000 that are currently connected to the device 1000 with respect to the counterpart devices 2000 that may be connected to the device 1000. For example, although not shown, if a counterpart device 2011, a counterpart device 2012, a counterpart device 2013, and a counterpart device 2014 are connectable to the device 1000 and only the counterpart device 2011 and the counterpart device 2012 are currently connected to the device 1000, the device 1000 may display "2/4" or "50%" on the screen of the device 1000.

Also, the device 1000 may display a ratio of the counterpart devices 2000 which the device 1000 is sharing the object with to the counterpart devices 2000 connected to the device 1000. For example, if the counterpart device 2011, the counterpart device 2012, the counterpart device 2013, and the counterpart device 2014 are connected to the device 1000 and the counterpart device 2011 and the counterpart device 2012 share the object with the device 1000, the device 1000 may display "2/4" or "50%" on the screen of the device 1000.

In addition, the device 1000 may display a ratio of the counterpart devices 2000 displaying an object that is synchronized with the object displayed on the device 1000 to the counterpart devices 2000 that are connectable to the device 1000. For example, if the counterpart device 2011, the counterpart device 2012, the counterpart device 2013, and the counterpart device 2014 are connected to the device 1000, and the counterpart device 2011 and the counterpart device 2012 are displaying an object that is synchronized with the object displayed on the device 1000, the device 1000 may display "2/4" or "50%" on the screen of the device 1000.

Figure 3:
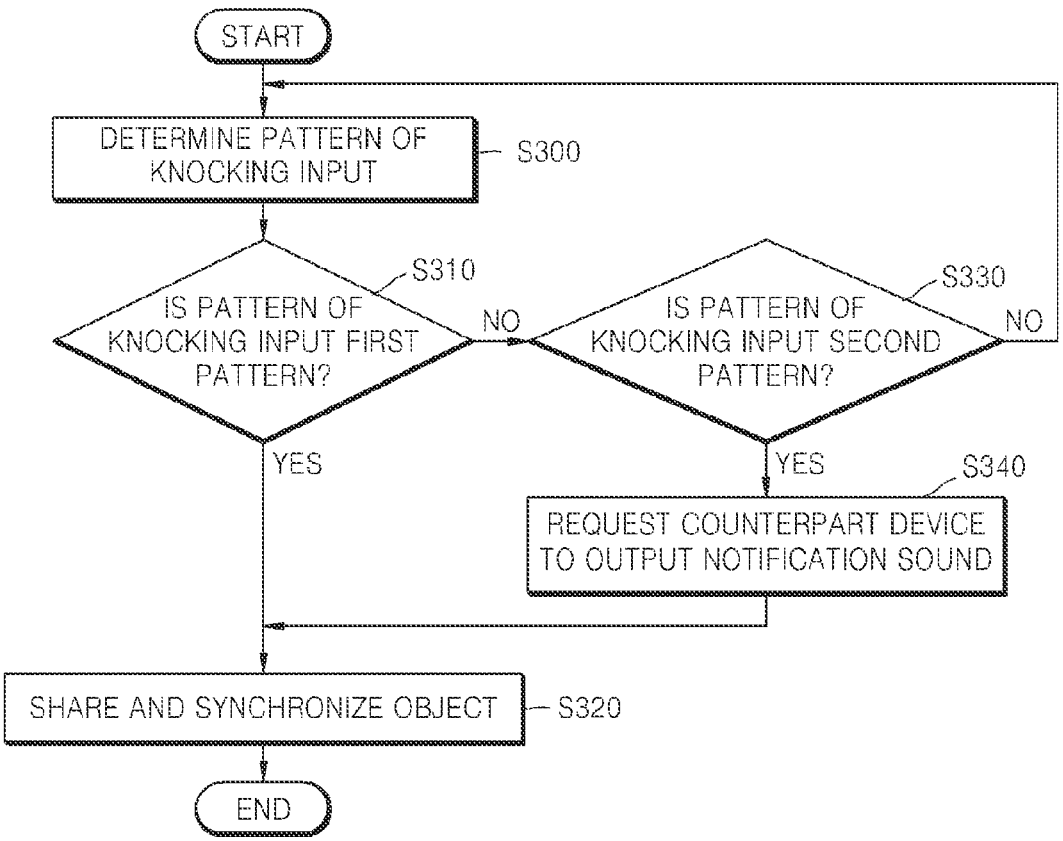
FIG. 3 is a flowchart illustrating a method of sharing an object by a device with a counterpart device based on a pattern of a knocking input according to an embodiment of the present disclosure.

FIG. 3 is a flowchart of a method of sharing an object with a counterpart device by the device 1000 based on a pattern of the knocking input according to an embodiment of the present disclosure.

Referring to FIG. 3, in operation S300, the device 1000 determines a pattern of a knocking input. The device 1000 may determine the pattern of the knocking input by using at least one of a touch sensor, a pressure sensor, a vibration sensor, and a microphone. For example, if the user knocks on the screen of the device 1000 a plurality of times, the device 1000 may determine the pattern of the knocking input by analyzing the number of knocks and the knocking interval.

In operation S310, the device 1000 may determine whether the pattern of the knocking input is a first pattern. The device 1000 may compare the pattern of the knocking input with the first pattern. When a degree of similarity between the pattern of the knocking input and the first pattern is equal to or greater than a predetermined level, the device 1000 may determine that the pattern of the knocking input is the first pattern. In this case, for example, the first pattern may be set in advance by the user or a manufacturer of the device 1000.

When it is determined that the pattern of the knocking input is the first pattern as a result of the determination in operation S310, the device 1000 executes operation S320.

In operation S320, the device 1000 shares an object with the counterpart device 2000, and synchronizes the shared object with the counterpart device 2000. The device 1000 may transmit at least one of link information for downloading the object, an identification value of the object, and the object to the counterpart device 2000. In addition, the device 1000 may transmit synchronization information about the determined object to the counterpart device 2000 in order to synchronize the determined object with the counterpart device 2000. Accordingly, the counterpart device 2000 may acquire the object and may display the object on a screen of the counterpart device 2000. The counterpart device 2000 may display the acquired object to be the same as the object displayed on the screen of the device 1000.

When it is determined that the pattern of the knocking input is not the first pattern as a result of determination in operation S310, the device 1000 executes operation S330.

In operation S330, the device 1000 determines whether the pattern of the knocking input is a second pattern. The device 1000 may compare the pattern of the knocking input with the second pattern. When a degree of similarity between the pattern of the knocking input and the second pattern is equal to or greater than a predetermined level, the device 1000 may determine the pattern of the knocking input as the second pattern. In this case, for example, the second pattern may be set in advance by the user or the manufacturer of the device 1000.

In operation S330, if it is determined that the pattern of the knocking input is the second pattern, the device 1000 may request the counterpart device 2000 to output a notification sound in operation S340. The counterpart device 2000 may output a notification sound that is set in advance. The device 1000 may return to execute operation S320.

Figure 4:
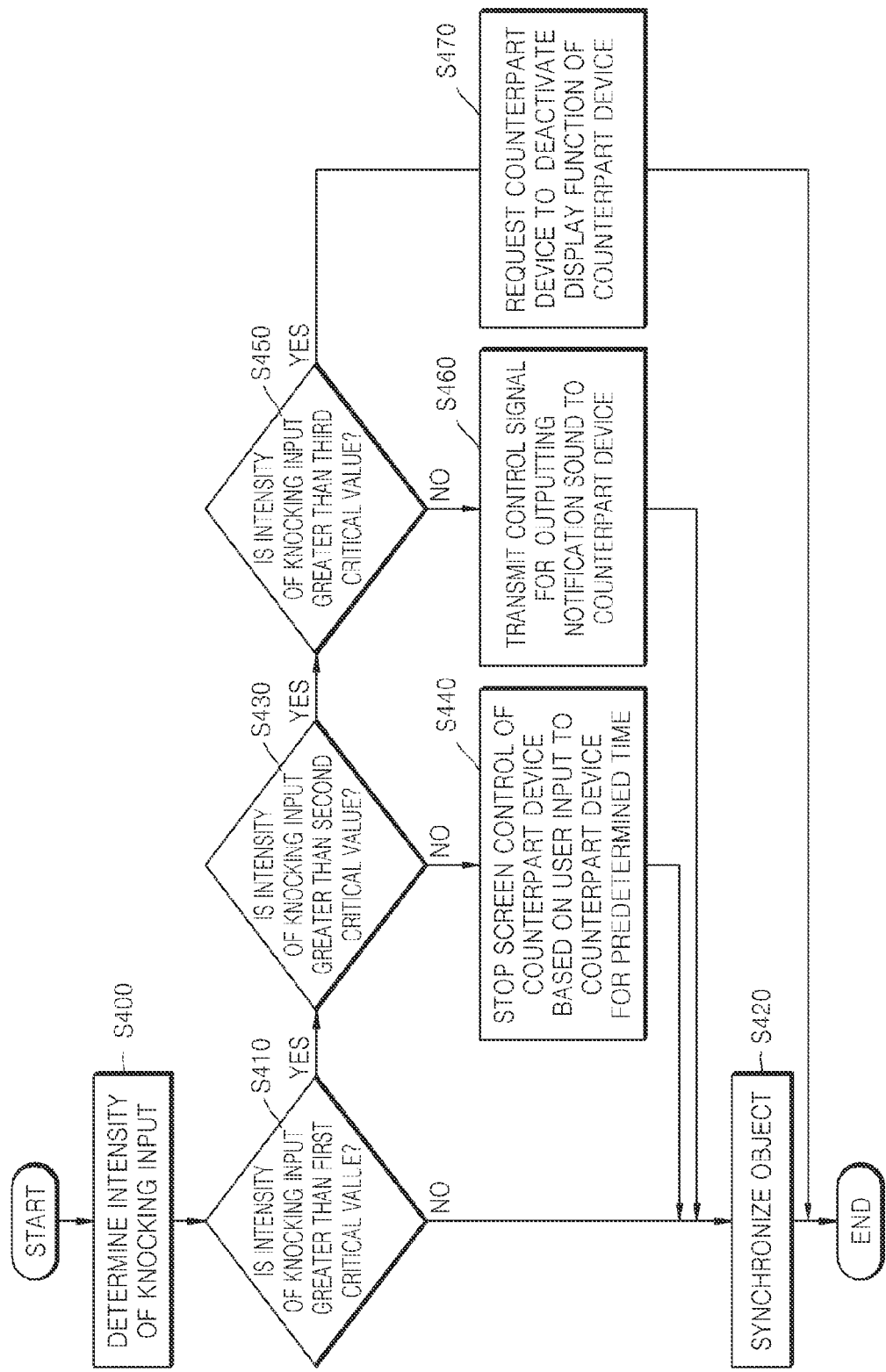
FIG. 4 is a flowchart of a method of sharing an object with a counterpart device by a device based on an intensity of a knocking input according to an embodiment of the present disclosure.

FIG. 4 is a flowchart of a method of sharing an object with a counterpart device by the device 1000, based on an intensity of the knocking input, according to the embodiment of the present disclosure.

Referring to FIG. 4, in operation S400, the device 1000 determines an intensity of the knocking input. The device 1000 may determine the intensity of the knocking input by using at least one of the pressure sensor, the vibration sensor, and the microphone.

For example, the device 1000 may determine the intensity of the knocking input by measuring the force applied to the screen or the bezel of the device 1000 by the knocking input by using the pressure sensor. Also, the device 1000 may measure an intensity of the sound generated by the knocking input on the screen of the device 1000 by using a microphone to determine an intensity of the knocking input.

In addition, the device 1000 may detect vibration generated by the knocking input on the periphery of the device 1000 by using a vibration sensor to determine the intensity of the knocking input. Also, the device 1000 may detect the sound generated by the knocking input on the periphery of the device 1000 by using the microphone to determine the intensity of the knocking input.

In operation S410, the device 1000 determines whether the intensity of the knocking input is greater than a first certain value. The device 1000 may compare the intensity of the knocking input with the first certain value stored in a memory to determine whether the intensity of the knocking input is greater than the first certain value. In this case, for example, the first certain value may be set by the user or the manufacturer of the device 1000.

In operation S410, if it is determined that the intensity of the knocking input is not greater than the first certain value, the device 1000 executes operation S420.

In operation S420, the device 1000 shares the object with the counterpart device 2000 and synchronizes the shared object displayed on the counterpart device 2000 with the object displayed on the device 1000. The device 1000 may transmit at least one of the link information for downloading the object, the identification value of the object, and the object to the determined counterpart device 2000. Also, the device 1000 may transmit synchronization information about the determined object to the counterpart device 2000 in order to synchronize the object. Accordingly, the counterpart device 2000 may acquire the object and may display the acquired object on the screen of the counterpart device 2000. Also, the counterpart device 2000 may display the acquired object to be the same as the object displayed on the screen of the device 1000.

As a result of the determination in operation S410, if it is determined that the intensity of the knocking input is greater than the first certain value, the device 1000 executes operation S430.

In operation S430, the device 1000 determines whether the intensity of the knocking input is greater than a second certain value. The device 1000 compares the intensity of the knocking input with the second certain value stored in a memory to determine whether the intensity of the knocking input is greater than the second certain value. In this case, for example, the second certain value may be set in advance by the user or the manufacturer of the device 1000.

In operation S430, if it is determined that the intensity of the knocking input is not greater than the second certain value, the device 1000 executes operation S440.

In operation S440, the device 1000 suspends user control of the screen of the counterpart device 2000 based on a user input to the counterpart device 2000, for a predetermined time period. The device 1000 may request the counterpart device 2000 to suspend user control of the screen of the counterpart device 2000 based on the user input to the counterpart device 2000. Accordingly, for a predetermined time period, the counterpart device 2000 may ignore a user inputs that the counterpart device 2000 receives. After that, the device 1000 may execute operation S420.

In operation S430, if it is determined that the intensity of the knocking input is greater than the second certain value, the device 1000 executes operation S450.

In operation S450, the device 1000 determines whether the intensity of the knocking input is greater than a third certain value. The device 1000 compares the intensity of the knocking input with the third certain value stored in the memory to determine whether the intensity of the knocking input is greater than the third certain value. In this case, for example, the third certain value may be set in advance by the user or the manufacturer of the device 1000.

In operation S450, if it is determined that the intensity of the knocking input is not greater than the third certain value, the device 1000 executes operation S460.

In operation S460, the device 1000 may request the counterpart device 2000 to output a notification sound, which may be set in advance. The device 1000 may return to operation S420.

As a result of determination in operation S450, if it is determined that the intensity of the knocking input is greater than the third certain value, the device 1000 may execute operation S470.

In operation S470, the device 1000 may request the counterpart device 2000 to deactivate the screen of the counterpart device 2000. The device 1000 may transmit a control signal for deactivating the display function of the counterpart device 2000 to the counterpart device 2000. Accordingly, the counterpart device 2000 may deactivate the display function of the counterpart device 2000, and the counterpart device 2000 may display nothing on the screen thereof. However, the embodiments of the present disclosure are not limited thereto.

For example, the device 1000 may request the counterpart device 2000 to display a black screen on the screen of the counterpart device 2000 in a state where the display function of the counterpart device 2000 is activated. Also, for example, the device 1000 may request the counterpart device 2000 to display a notification message or a notification image on the screen of the counterpart device 2000 in a state where the display function of the counterpart device 2000 is activated. The notification message or the notification image may include text, for example, "look at the electronic board please."

Figure 5:
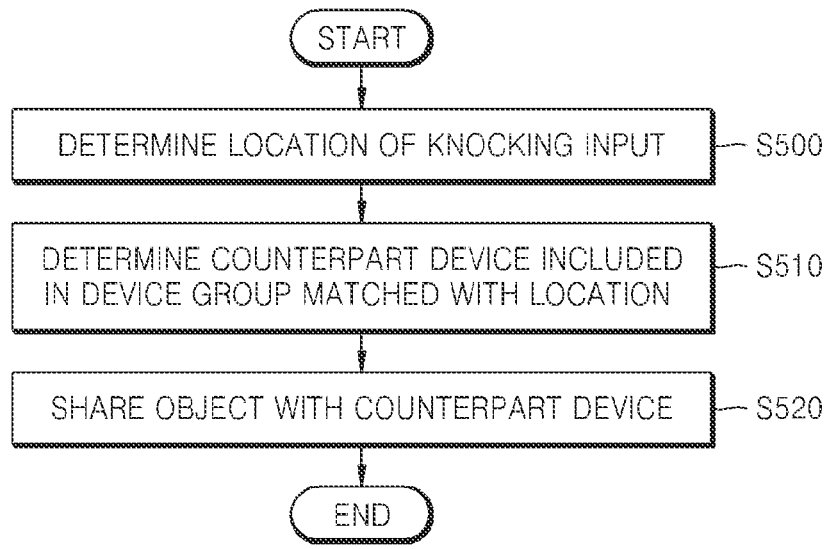
FIG. 5 is a flowchart of a method of determining a counterpart device with which to share an object by a device based on a location of a knocking input according to an embodiment of the present disclosure.

FIG. 5 is flowchart of a method of determining a counterpart device with which to share the object by the device 1000 based on a location of the knocking input according to an embodiment of the present disclosure.

Referring to FIG. 5, in operation S500, the device 1000 determines a location of the knocking input. The device 1000 may determine the location of the knocking input by using at least one of the touch sensor, a pressure sensor, the vibration sensor, and the microphone.

The device 1000 may determine the location on the screen or the bezel of the device 1000 that is knocked on by the user by using, for example, the touch sensor and the pressure sensor. Also, for example, the device 1000 may determine a peripheral region of the device 1000 that is knocked on by the user by using the vibration sensor.

For example, the device 1000 may determine a peripheral region of the device 1000 that is knocked on by the user by detecting the sound generated due to the knocking input by using the microphone. The device 1000 may determine the location where the sound is generated by using a plurality of microphones of a microphone array (not shown) in the device 1000. In this case, a plurality of microphones may be arranged in predetermined locations having predetermined distances between them in the device 1000. For example, four microphones may be arranged at vertexes of a boundary of the device 1000. For example, a vertical line connecting the four microphones may be formed as a rectangle, a square, or a rhombus. Further, a plurality of microphones may be arranged in the device 1000 to configure a circle. However, various embodiments of the present disclosure are not limited thereto. In addition, the plurality of microphones included in the device 1000 may be, for example, directional microphones. In this case, the plurality of directional microphones may be arranged to be oriented toward the boundary of the device 1000. The plurality of microphones included in the device 1000 may respectively detect the sound generated due to the knocking by the user (knocking sound). The plurality of microphones included in the device 1000 may generate audio signals representing the detected sound. The device 1000 may compare the audio signals generated by the plurality of microphones to determine the location where the sound generated due to the knocking by the user (knocking sound) is generated. The device 1000 may compare the number of times that the knocking sounds are detected by each of the plurality of microphones. Also, the device 1000 may compare, for example, wavelengths and intensities of the audio signals generated by the plurality of microphones with one another. In addition, the device 1000 may determine the location where or the direction in which the knocking sound is generated based on the comparison results and the locations of the plurality of microphones.

In operation S510, the device 1000 determines a counterpart device 2000 included in a device group which is matched with the determined location. A plurality of counterpart devices 2000 may be grouped, and the device 1000 may identify a device group corresponding to the location of the knocking input. Also, the device 1000 may determine a counterpart device 2000 included in the identified device group as a device with which to share the object.

For example, the user of the device 1000 divides the screen of the device 1000 into four regions, and may map the four regions to four device groups. In this case, when the user knocks on a second region from among the four regions, the device 1000 may determine the counterpart device 2000 included in a group 2 as a device with which to share the object.

For example, the device 1000 may match the device groups according to locations of the bezel. In this case, when the user knocks on a lower bezel of the device 1000, the device 1000 may determine the counterpart device 2000 included in a group 4 as the device to share the object.

The user of the device 1000 may divide a peripheral area of the device 1000 into four regions, and may match the four regions with four device groups, respectively. In this case, when the user knocks on a right region from among the peripheral regions of the device 1000, the device 1000 may determine the counterpart device 2000 included in a group 2 as the device to share the object.

In operation S520, the device 1000 shares the object with the counterpart device 2000 that is determined. The device 1000 may transmit at least one of the link information for downloading the object, the identification value of the object, and the object to the determined counterpart device 2000. Also, the device 1000 may transmit synchronization information about the object to the counterpart device 2000 in order to synchronize the object.

If the device 1000 transmits the link information for downloading the object to the counterpart device 2000, the counterpart device 2000 may download or stream the object from the server 3000 by using the link information. Also, if the device 1000 transmits the object to the counterpart device 2000, the counterpart device 2000 may download or stream the object from the device 1000. In addition, if the device 1000 transmits the identification value of the object to the counterpart device 2000, the counterpart device 2000 may acquire the object from a memory in the counterpart device 2000 or the server 3000 by using the identification value of the object, and may display the object.

Figure 6:
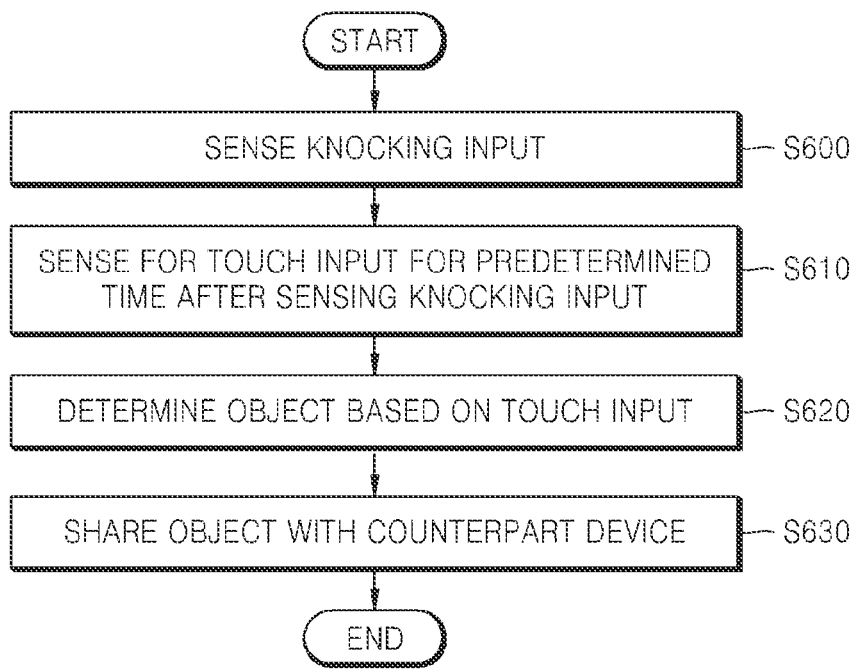
FIG. 6 is a flowchart of a method of determining an object to be shared with a counterpart device based on a touch input after receiving a knocking input according to an embodiment of the present disclosure.

FIG. 6 is a flowchart of a method of determining an object to be shared with the counterpart device 2000 by the device 1000 based on a touch input after receiving the knocking input according to an embodiment of the present disclosure.

Referring to FIG. 6, in operation S600, the device 1000 detects the knocking input. The device 1000 may detect the knocking input on the screen of the device 1000 or the knocking input on the bezel of the device 1000. The device 1000 may detect the knocking input on the screen of the device 1000 or the knocking input on the bezel of the device 1000 by using at least one of the touch sensor, the pressure sensor, the vibration sensor, and the microphone.

Further, the device 1000 may detect the knocking input on the peripheral region of the device 1000. The device 1000 may detect vibration generated when the peripheral region of the device 1000 is knocked on by using the vibration sensor. Also, the device 1000 may detect the sound generated when the peripheral region of the device 1000 is knocked on by using the microphone.

If the user knocks on the periphery of the device 1000 by using an additional input device (not shown), the device 1000 may receive a knocking input signal from the input device (not shown).

In operation S610, the device 1000 may determine whether a touch input is input within a predetermined time period after the detecting of the knocking input. For example, the device 1000 may determine whether a touch input is detected within one second after the detecting of the knocking input. The touch input may include a tap input, a drag input, and a drawing input, and the like; however, various embodiments of the present disclosure are not limited thereto.

In operation S620, the device 1000 may determine an object based on the touch input detected within the predetermined time period. For example, if the touch input detected within the predetermined time period after the detecting of the knocking input is the tap input, the device 1000 may determine an object displayed on the location where the tap input is received from among the objects displayed on the screen of the device 1000 as the object to be shared with the counterpart device 2000. If the touch input detected within a predetermined time period after the detecting of the knocking input is the drag input, the device 1000 may determine an object included in a region generated by the drag input from among the objects displayed on the screen of the as the object to be shared with the counterpart device 2000.

If the touch input detected within the predetermined time period after the detecting of the knocking input is the drawing input, the device 1000 may determine an object displayed in a region generated by the drawing input from among the objects displayed on the screen of the device 1000 as the object to be shared with the counterpart device 2000. For example, if the user draws a circle on the screen of the device 1000, an object displayed in the circle may be determined as the object to be shared with the counterpart device 2000.

In operation S630, the device 1000 shares the object with the counterpart device 2000. The device 1000 may transmit at least one of the link information for downloading the object, the identification value of the object, and the object to the counterpart device 2000. The device 1000 may transmit synchronization information about the object to the counterpart device 2000 in order to synchronize the object.

In a case where the device 1000 transmits the link information for downloading the object to the counterpart device 2000, the counterpart device 2000 may download or stream the object from the server 3000 by using the link information. In a case where the device 1000 transmits the object to the counterpart device 2000, the counterpart device 2000 may download or stream the object from the device 1000. In a case where the device 1000 transmits the identification value of the object, the counterpart device 2000 may acquire the object from the memory in the counterpart device 2000 or the server 3000 by using the identification value of the object and display the object.

FIGS. 7A and 7B are diagrams demonstrating a knocking input on the device 1000 according to an embodiment of the present disclosure.

Referring to FIG. 7A, the user may knock on the screen of the device 1000. The device 1000 may detect the knocking input by using the touch sensor and the pressure sensor included in the screen of the device 1000. In addition, the device 1000 may detect the knocking input by using the vibration sensor and the microphone included in the device 1000. Also, if the intensity of the knocking input detected when the user knocks on the screen of the device 1000 is greater than a certain value, the device 1000 may determine that the knocking input is received.

Referring to FIG. 7B, the user may knock on the bezel of the device 1000. The device 1000 may detect the knocking input by using the touch sensor and the pressure sensor included in the bezel of the device 1000. The device 1000 may detect the knocking input by using the vibration sensor and the microphone included in the device 1000. In addition, if the intensity of the knocking input detected when the user knocks on the bezel of the device 1000 is greater than the certain value, the device 1000 may determine that the knocking input is received.

Figure 8:
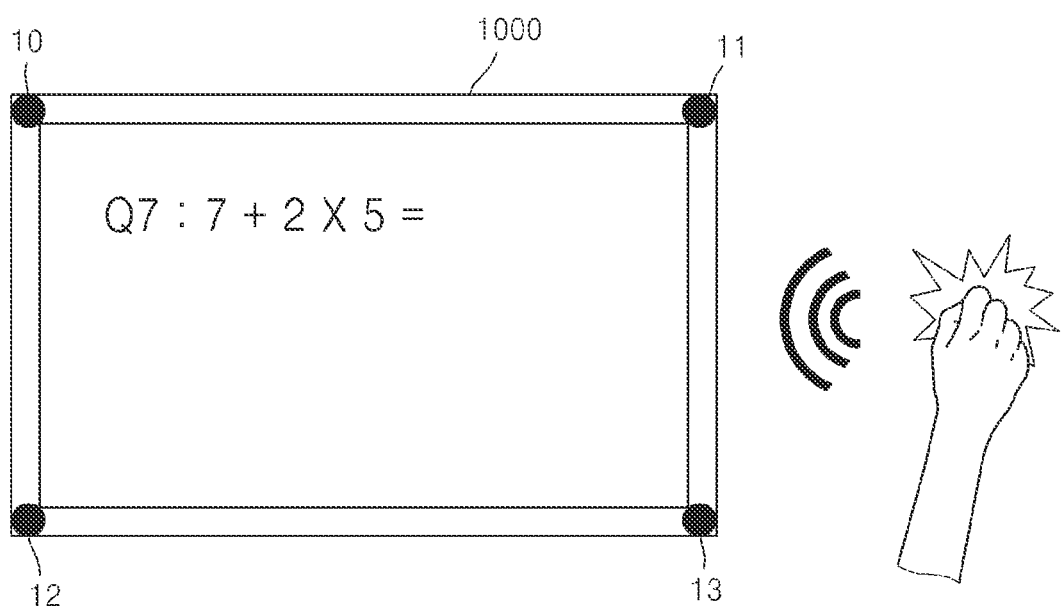
FIG. 8 is a diagram demonstrating a knocking input to a periphery of a device according to an embodiment of the present disclosure.

FIG. 8 is a diagram demonstrating a knocking input on a periphery of the device 1000 according to an embodiment of the present disclosure.

Referring to FIG. 8, the device 1000 may be attached to a wall surface, and the user may knock on the wall surface around the device 1000. In this case, the device 1000 may detect the vibration generated by the knocking by the user by using the vibration sensor included in the device 1000, and may determine whether the wall surface around the device is knocked on based on the magnitude of the vibration.

The device 1000 may detect the sound generated due to the knocking of the user by using the microphone in the device 1000, and may determine whether the wall surface around the device is knocked on based on the intensity of the sound. In addition, the device 1000 may use the microphone to detect the sound generated due to the knocking input and thereby determine which peripheral region of the device 1000 is knocked on by the user. The device 1000 may determine the location from which the sound is generated by using the microphone array (not shown) in the device 1000. In this case, a plurality of microphones 10, 11, 12, and 13 may be arranged at predetermined locations at predetermined intervals in the device 1000. For example, four microphones may respectively be arranged at vertexes of a boundary of the device 1000. For example, vertical lines connecting the four microphones may form a rectangle, a square, or a rhombus. A plurality of microphones may be arranged in the device 1000 in a circular configuration. However, various embodiments of the present disclosure are not limited thereto.

Figure 9:
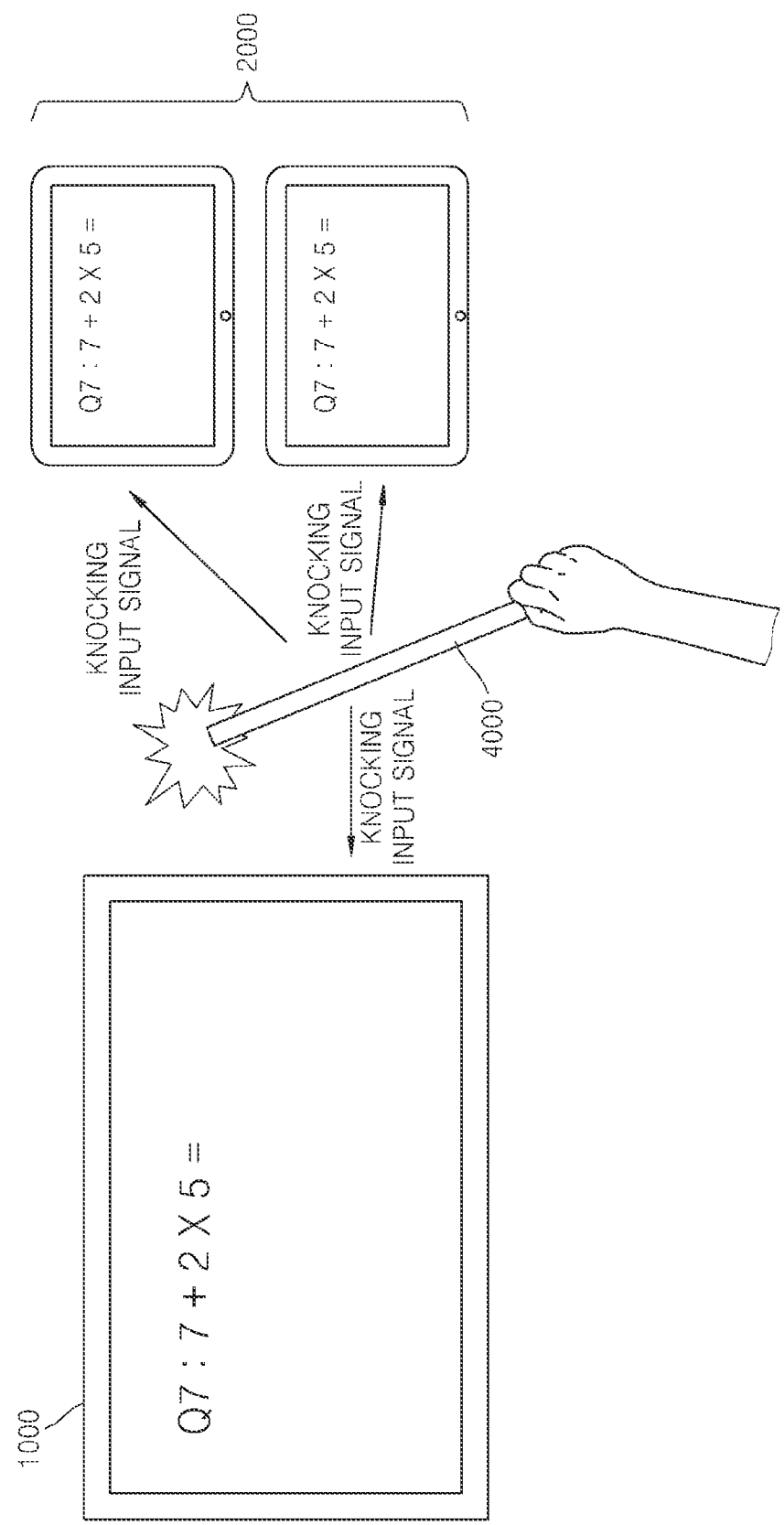
FIG. 9 is a diagram demonstrating a knocking input to a periphery of a device by using an input device according to an embodiment of the present disclosure.

FIG. 9 is a diagram demonstrating a knocking input on a peripheral region of the device 1000 by using an input device according to an embodiment of the present disclosure.

Referring to FIG. 9, the device 1000 may be attached to a wall surface, and the user may knock on the wall surface around the device 1000 by using an input device 4000. Also, the input device 4000 may detect the knocking input and may transmit a knocking input signal to the device 1000. For example, the input device 4000 may use a sensor in the input device 4000 to determine whether the wall surface around the device 1000 is knocked on by the input device 4000.

Further, an input device 4000 may transmit a knocking input signal to the counterpart device 2000. In this case, the counterpart device 2000 may receive the knocking input signal and may request the device 1000 to share an object which is displayed on the device 1000. However, various embodiments of the present disclosure are not limited thereto.

In addition, the input device 4000 may be directly connected to the device 1000 and the counterpart device 2000 via a short range communication network; however, various embodiments of the present disclosure are not limited thereto. The input device 4000 may be connected to the device 1000 and the counterpart device 2000 via a predetermined AP.

Figure 10:
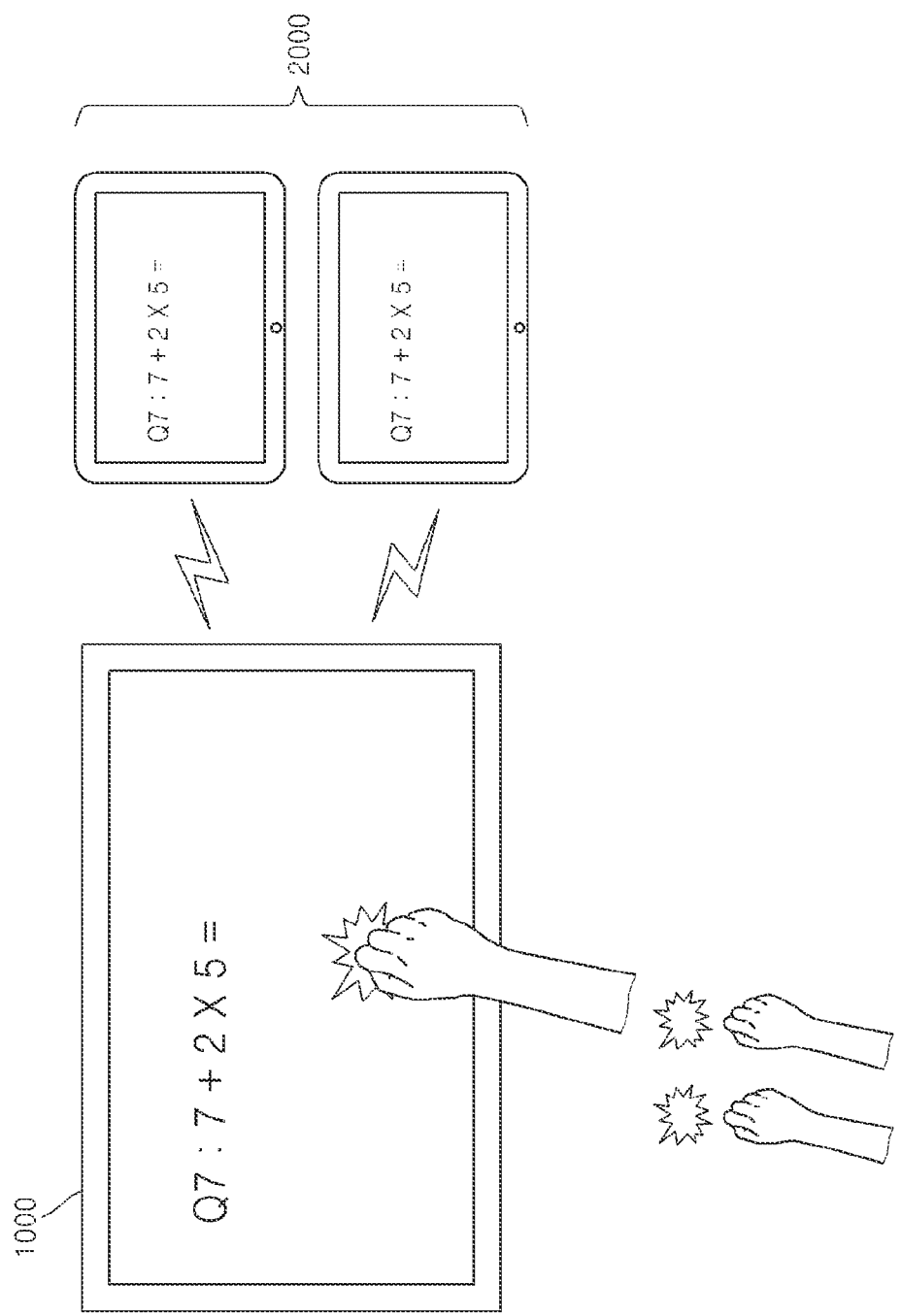
FIG. 10 is a diagram illustrating an example of synchronizing objects displayed on both a screen of a device and a screen of a counterpart device according to a pattern of a knocking input, according to an embodiment of the present disclosure.

FIG. 10 is a diagram demonstrating an example of synchronizing objects displayed on the screen of the device 1000 and the screen of each of the counterpart devices 2000 according to a pattern of the knocking input according to an embodiment of the present disclosure.

Referring to FIG. 10, when the user quickly knocks twice on the screen of the device 1000, the device 1000 may share a text displayed on the screen of the device 1000, that is, "Q7:7+2*5=", with each of the counterpart devices 2000. The device 1000 may transmit the text "Q7:7+2*5=" to the counterpart devices 2000. Also, the device 1000 may transmit information about a font size of the text "Q7:7+2*5=" and a location of the text "Q7:7+2*5=" on the screen to the counterpart device 2000. Accordingly, the counterpart devices 2000 may display the text "Q7:7+2*5=" to be the same as the text "Q7:7+2*5=" displayed on the screen of the device 1000.

Figure 11:
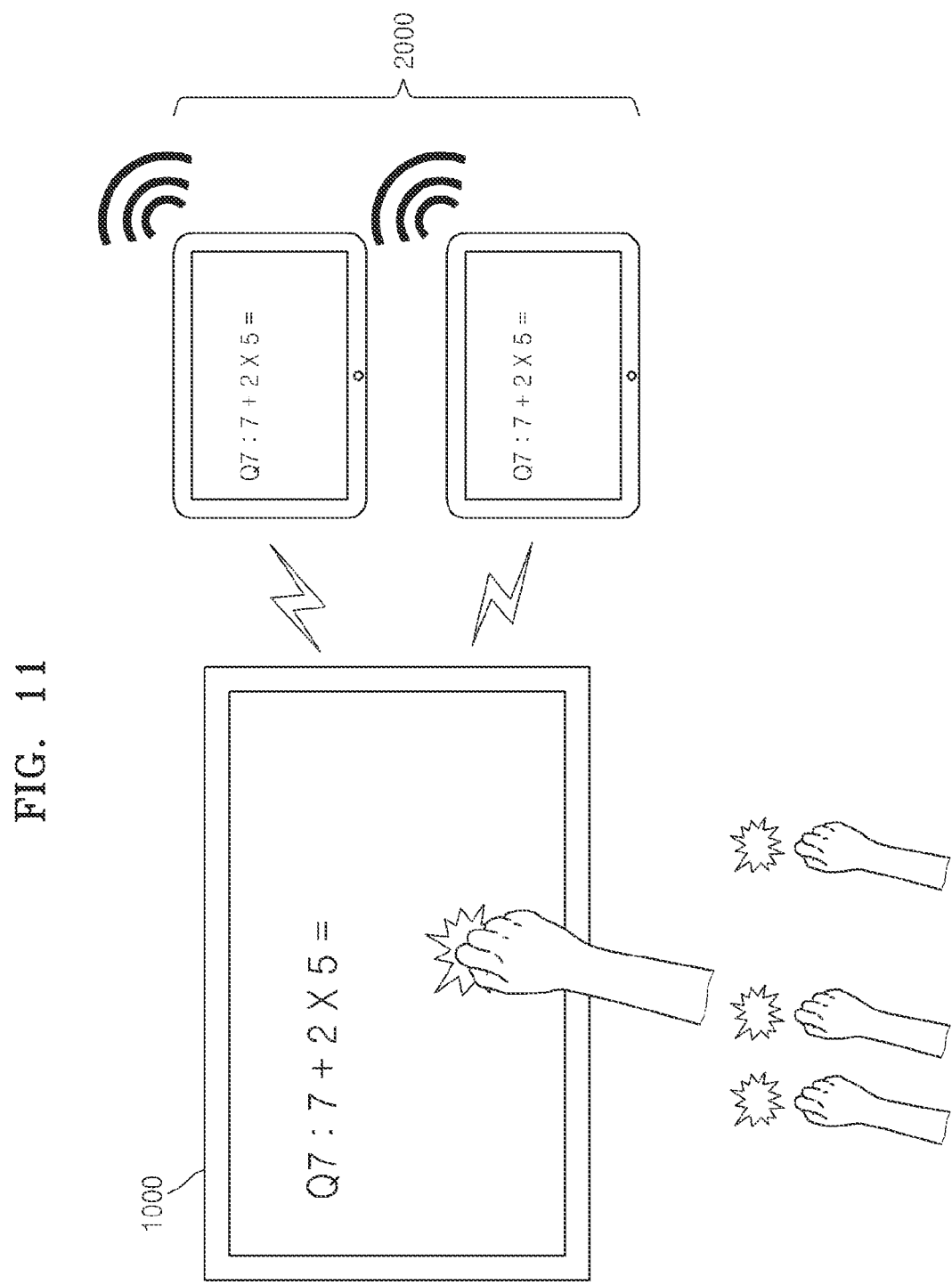
FIG. 11 is a diagram illustrating an example of synchronizing objects displayed on both a screen of a device and a screen of a counterpart device and outputting a notification sound from the counterpart device according to a pattern of a knocking input according to an embodiment of the present disclosure.

FIG. 11 is a diagram demonstrating an example, in which objects displayed on the screen of the device 1000 and the screen of the counterpart device 2000 are synchronized and a notification sound is output from the counterpart device 2000 according to the pattern of the knocking input, according to the embodiment of the present disclosure.

Referring to FIG. 11, when the user quickly knocks twice on the screen of the device 1000 twice, pauses, and then knocks again, the device 1000 may share the text "Q7:7+2*5=" that is displayed on the screen of the device 1000 with the counterpart devices 2000, and the counterpart devices 2000 may output a predetermined notification sound. The device 1000 may transmit the text "Q7:7+2*5=" to the counterpart devices 2000. Also, the device 1000 may transmit information about the font size of the text "Q7:7+2*5=" and the location of the text "Q7:7+2*5=" on the screen of the device 1000 to the counterpart devices 2000. Accordingly, the counterpart devices 2000 may display the text "Q7:7+2*5=" to be the same as the text "Q7:7+2*5=" displayed on the screen of the device 1000.

In addition, the device 1000 may request the counterpart devices 2000 to output the notification sound, and the counterpart devices 2000 may output a predetermined notification sound in response to the request from the device 1000.

Figure 12:
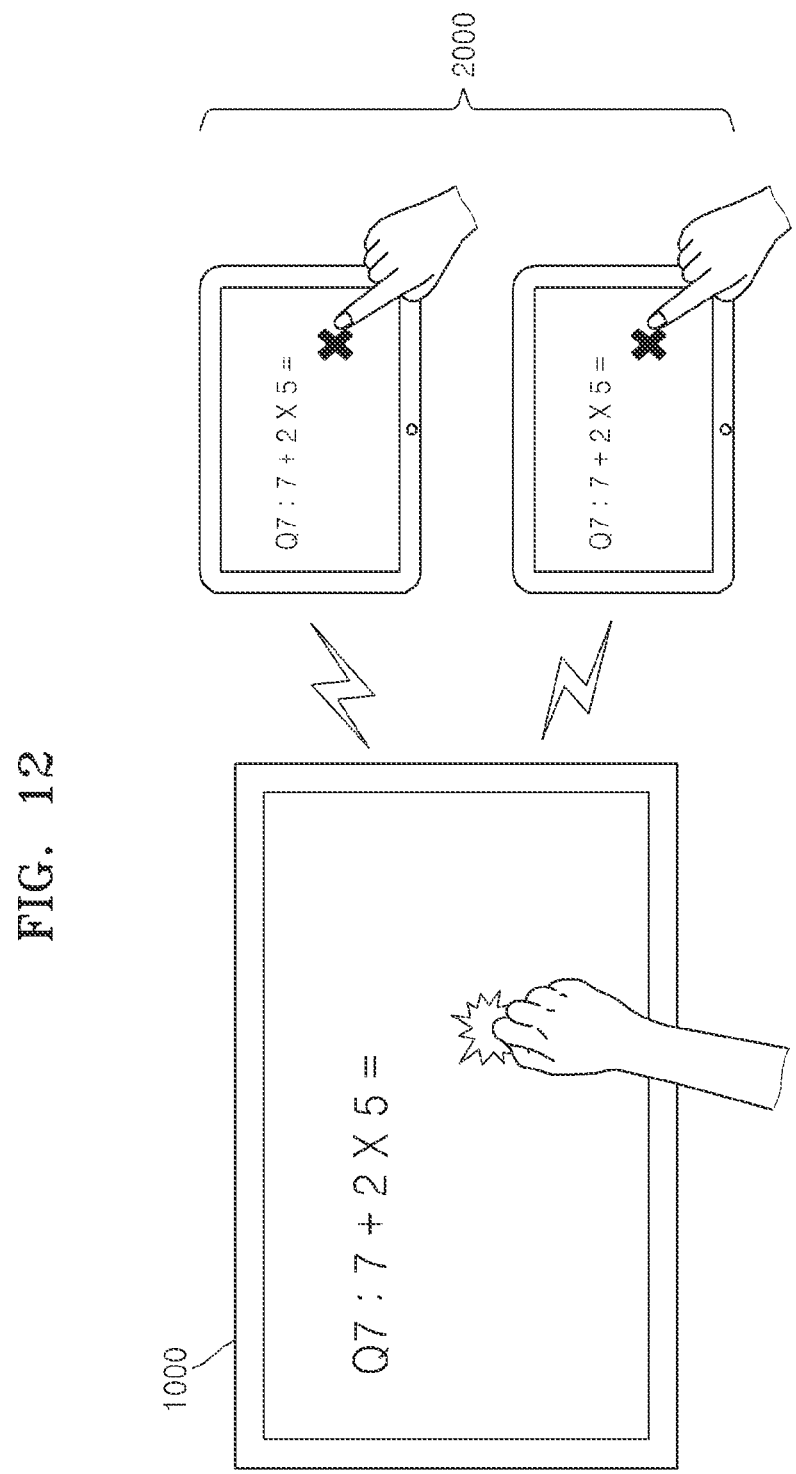
FIGS. 12, 13, and 14 are diagrams illustrating examples of changing a screen control authority according to an intensity of a knocking input according to embodiments of the present disclosure.
Figure 13:
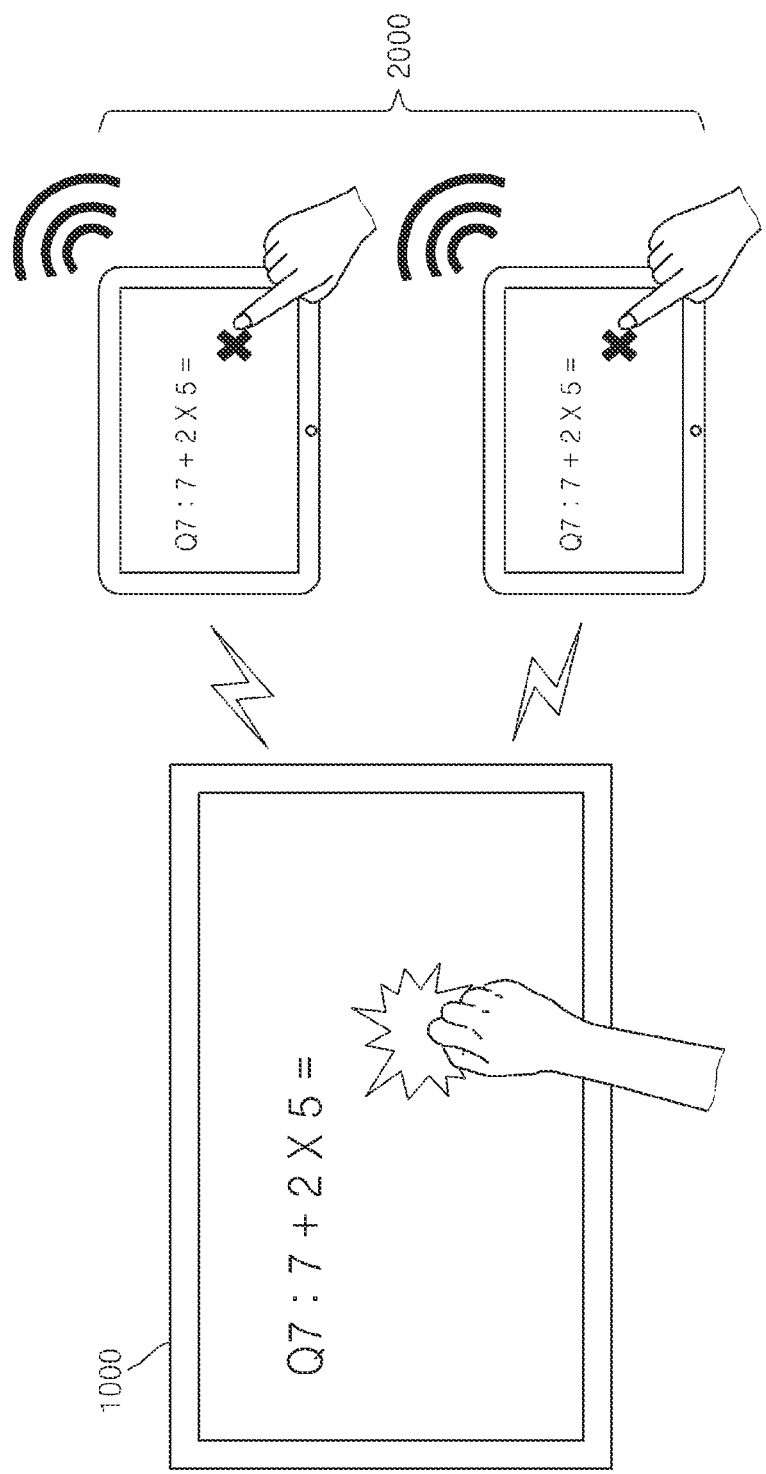
Figure 14:
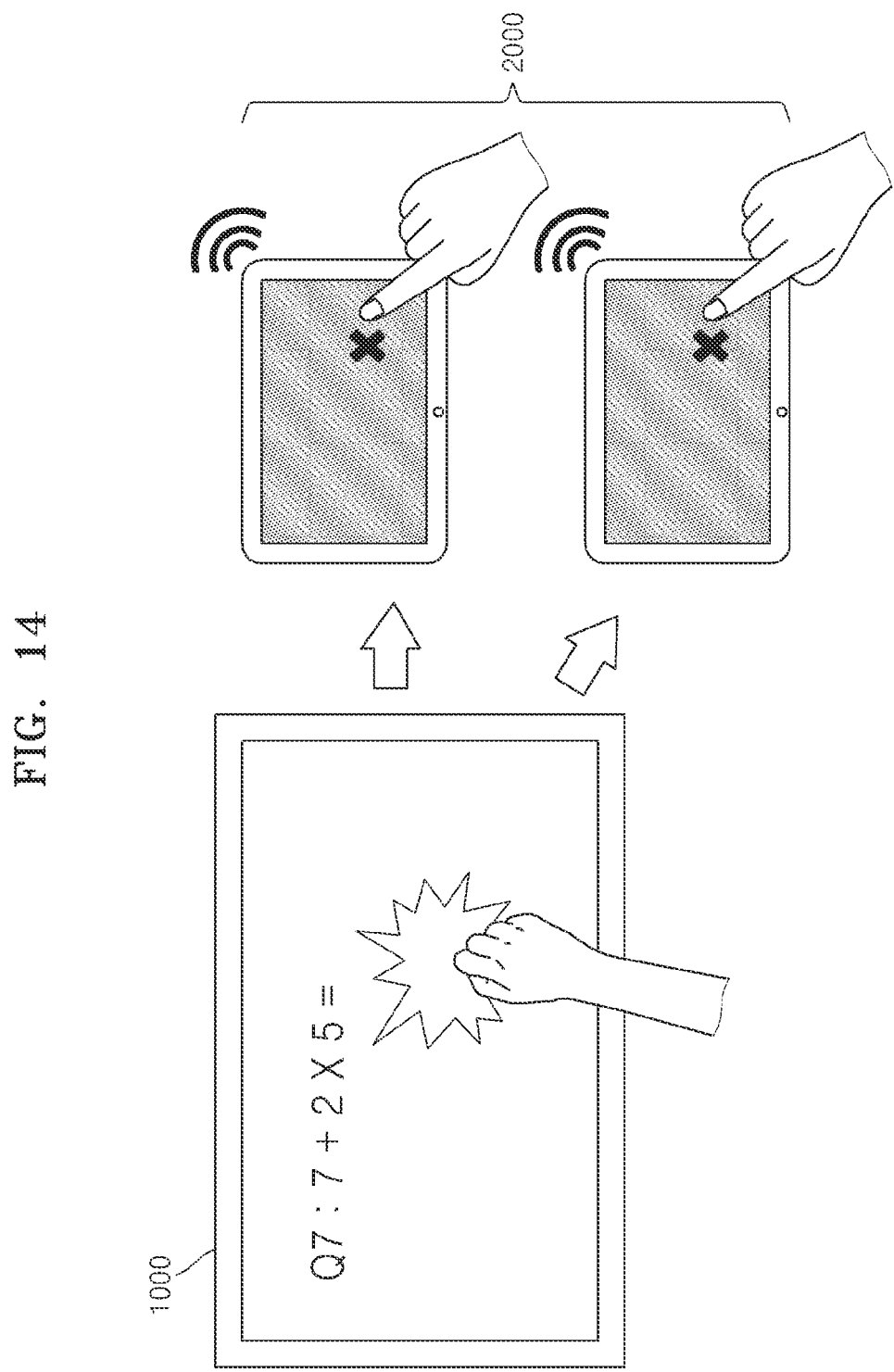

FIGS. 12 to 14 are diagrams demonstrating examples of changing a control authority of a screen in each of the counterpart devices 2000 according to an intensity of the knocking input according to the embodiment of the present disclosure.

Referring to FIG. 12, the user may knock on the screen of the device 1000 with a force that is greater than the first certain value and less than the second certain value. Accordingly, the device 1000 may share the text "Q7:7+2*5=" that is displayed on the screen thereof with the counterpart devices 2000. Also, the device 1000 may suspend the screen control of the counterpart devices 2000 based on the user input to the counterpart devices 2000 for a predetermined time period. In this case, the device 1000 may request the counterpart devices 2000 to change the control authority of a screen or may transmit a control signal for changing the control authority of a screen to the counterpart devices 2000. Accordingly, the counterpart devices 2000 may ignore the user input for the predetermined time period.

Also, referring to FIG. 13, the user may knock on the screen of the device 1000 with a force that is greater than the second certain value and less than the third certain value. Accordingly, the device 1000 may share the text "Q7:7+2*5=" that is displayed on the screen thereof with the counterpart device 2000. In addition, the device 1000 may suspend user control of the screen of the each counterpart device 2000 based on the user input to the counterpart device 2000, for a predetermined time period. In addition, the device 1000 may cause the counterpart devices 2000 to output a notification sound. In this case, the device 1000 may request the counterpart devices 2000 to output the notification sound, or may transmit a control signal to the counterpart devices 2000 which causes the counterpart devices 2000 to output the notification sound. Accordingly, the counterpart devices 2000 may output the notification sound for the predetermined time period.

In addition, referring to FIG. 14, the user may knock on the screen of the device 1000 with a force that is greater than the third certain value. Accordingly, the device 1000 may suspend the user control of the screen of the each counterpart device 2000 based on the user input to the counterpart device 2000 for a predetermined time period. Also, the device 1000 may cause the counterpart devices 2000 to output a notification sound. In addition, the device 1000 may deactivate the display function of the counterpart devices 2000. In this case, the device 1000 may request the counterpart devices 2000 to deactivate the display function of the counterpart devices 2000, or may transmit a control signal for deactivating the display function the counterpart devices 2000, to the counterpart devices 2000. Accordingly, the counterpart devices 2000 may deactivate the display function for the predetermined time period. However, various embodiments of the present disclosure are not limited thereto, that is, the device 1000 may make the counterpart devices 2000 display a black screen on the screen of the counterpart devices 2000.

Figure 15:
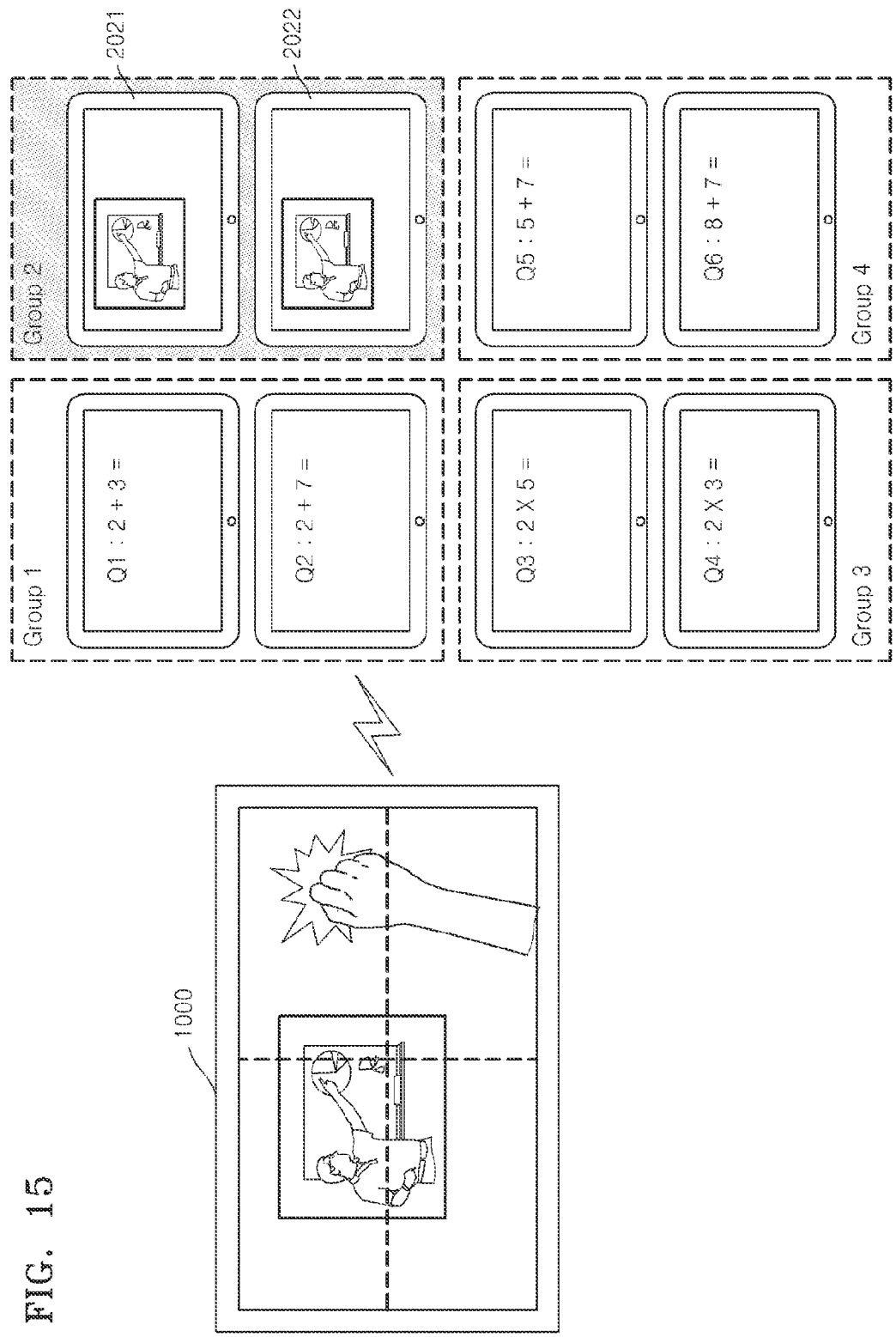
FIGS. 15 and 16 are diagrams illustrating examples of determining a counterpart device with which to share an object based on a knocking input to a screen of a device according to various embodiments of the present disclosure.
Figure 16:
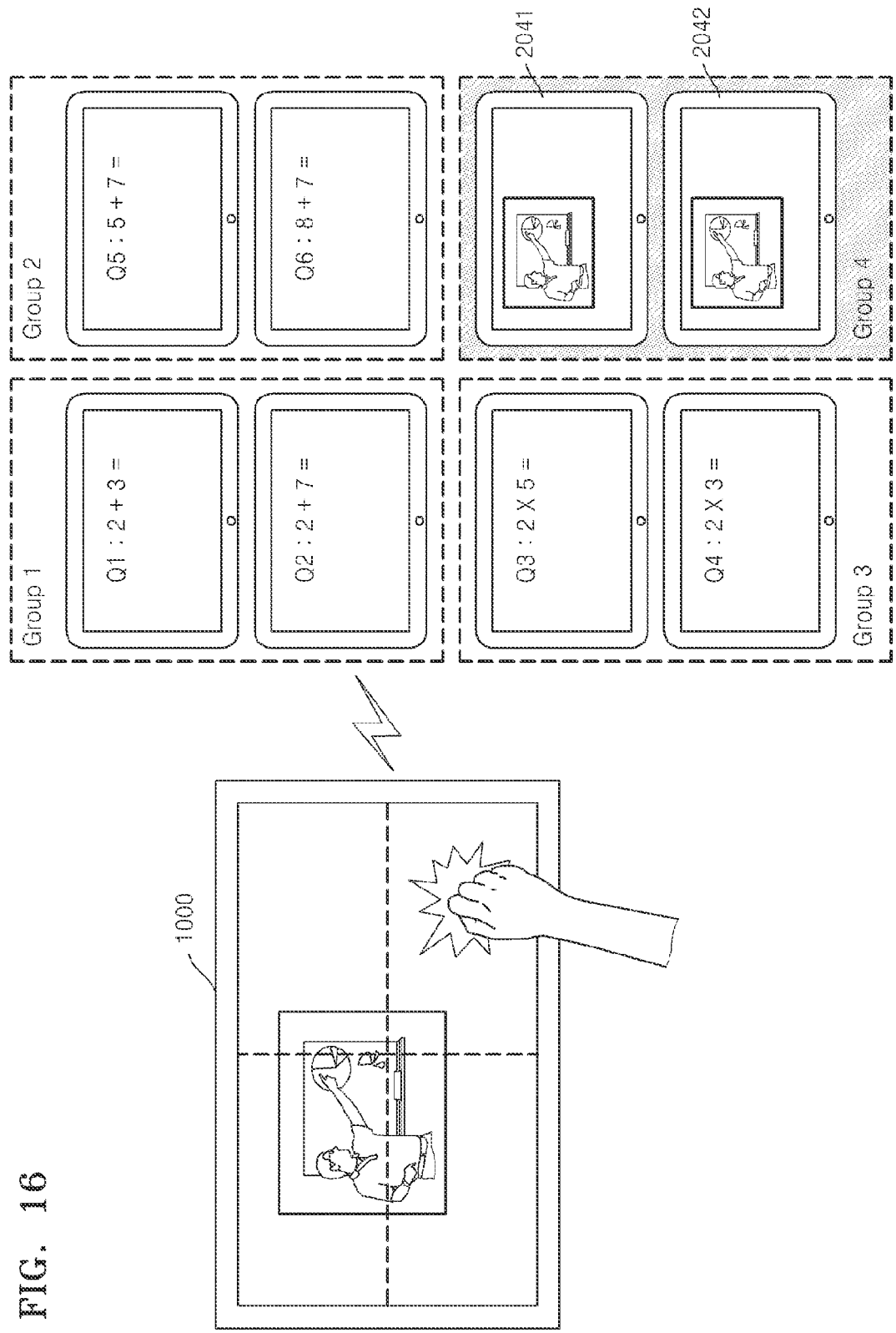

FIGS. 15 and 16 are diagrams demonstrating an example of determining a counterpart device to share the object based on a knocking input on the screen of the device 1000, according to the embodiment of the present disclosure.

Referring to FIGS. 15 and 16, the screen of the device 1000 may be divided into four regions. In addition, the four regions may be respectively matched to a plurality of device groups. For example, an upper left region in the screen of the device 1000 may be matched to 'Group 1', and an upper right region in the screen of the device 1000 may be matched to 'Group 2'. Also, a lower left region in the screen of the device 1000 may be matched to 'Group 3', and a lower right region in the screen of the device 1000 may be matched to 'Group 4'.

Referring to FIG. 15, the user may knock on an upper right portion of the screen of the device 1000. Accordingly, the device 1000 may share and synchronize video content displayed on the screen of the device 1000 with counterpart devices 2021 and 2022 included in Group 2. In this case, the device 1000 may transmit one of a name of the video content displayed on the screen thereof, link information for downloading the video content, and the video content to the counterpart devices 2021 and 2022. The device 1000 may transmit information about the location on the screen of the device 1000 on which the video content is currently displayed to the counterpart devices 2021 and 2022. Therefore, video content that is the same as the video content displayed on the screen of the device 1000 may be respectively displayed on screens of the counterpart devices 2021 and 2022 included in Group 2.

Referring to FIG. 16, the user may knock on a lower right portion of the screen of the device 1000. Accordingly, the device 1000 may share and synchronize video content displayed on the screen of the device 1000 with counterpart devices 2041 and 2042 included in Group 4. In this case, the device 1000 may transmit one of a name of the video content displayed on the screen thereof, link information for downloading the video content, and the video content to the counterpart devices 2041 and 2042. The device 1000 may transmit information about current displaying location of the video content displayed on the screen thereof to the counterpart devices 2041 and 2042. Therefore, video content that is the same as the video content displayed on the screen of the device 1000 may be respectively displayed on screens of the counterpart devices 2041 and 2042 included in Group 4.

Figure 17:
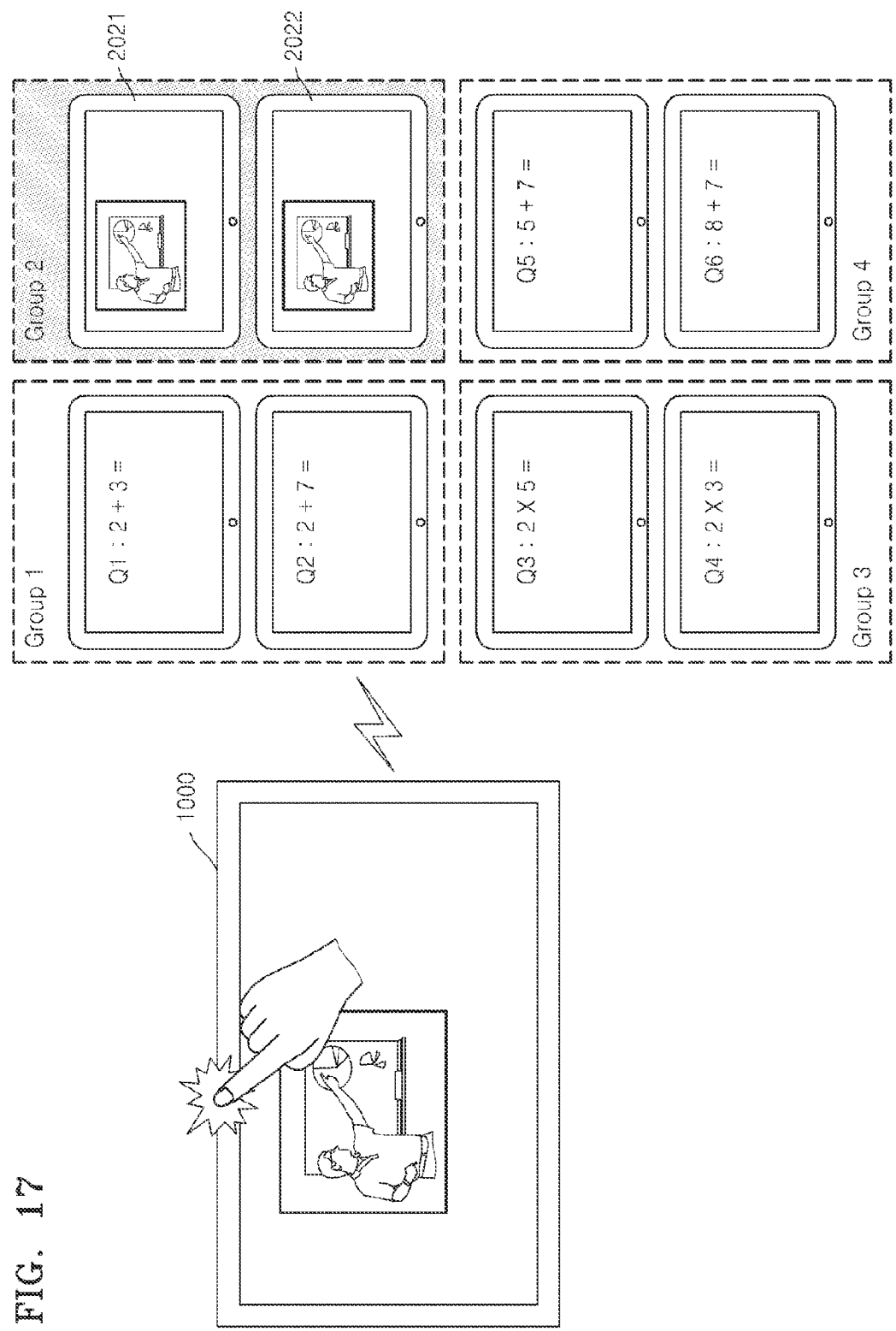
FIGS. 17 and 18 are diagrams illustrating examples of determining a counterpart device with which to share an object based on a knocking input to a bezel of a device according to various embodiments of the present disclosure.
Figure 18:
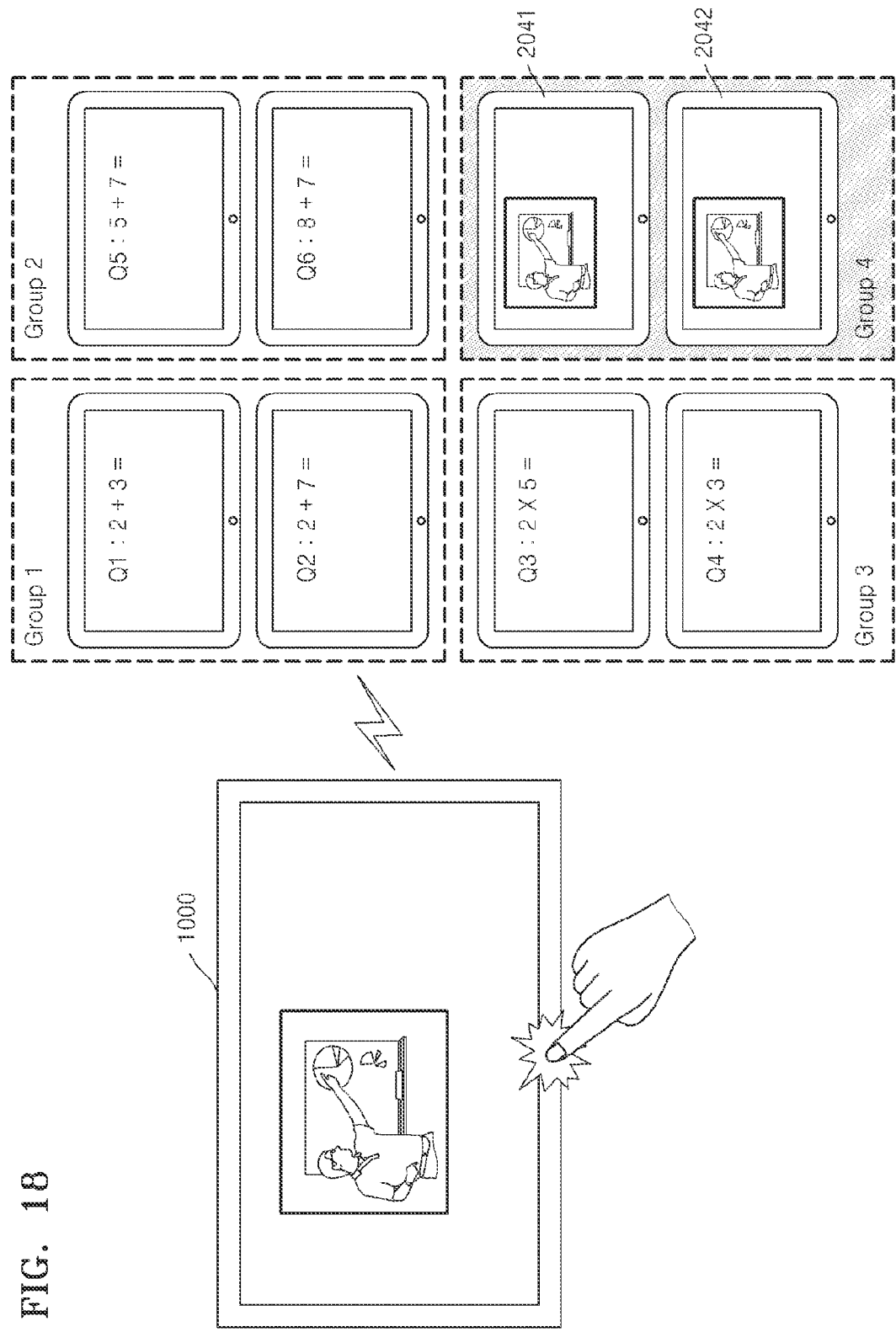

FIGS. 17 and 18 are diagrams illustrating an example of determining a counterpart device to share the object based on the knocking input on a bezel of the device 1000, according to the embodiment of the present disclosure.

Referring to FIGS. 17 and 18, left, right, upper, and lower portions of the bezel of the device 1000 may be respectively matched with a plurality of device groups. For example, the left portion of the bezel of the device 1000 may be matched with 'Group 1', and the upper portion of the bezel of the device 1000 may be matched with 'Group 2'. Also, the right portion of the bezel of the device 1000 may be matched with 'Group 3', and the lower portion of the bezel of the device 1000 may be matched with 'Group 4'.

Referring to FIG. 17, the user may knock on the upper bezel of the device 1000. Accordingly, the device 1000 may share and synchronize video content displayed on the screen of the device 1000 with counterpart devices 2021 and 2022 included in the Group 2. In this case, the device 1000 may transmit one of a name of the video content displayed on the screen thereof, link information for downloading the video content, and the video content to the counterpart devices 2021 and 2022. The device 1000 may transmit information about current displaying location of the video content displayed on the screen thereof to the counterpart devices 2021 and 2022. Therefore, video content that is the same as the video content displayed on the screen of the device 1000 may be respectively displayed on screens of the counterpart devices 2021 and 2022 included in the Group 2.

Referring to FIG. 18, the user may knock on the lower bezel of the device 1000. Accordingly, the device 1000 may share and synchronize a video content displayed on the screen of the device 1000 with counterpart devices 2041 and 2042 included in the Group 4. In this case, the device 1000 may transmit one of a name of the video content displayed on the screen thereof, link information for downloading the video content, and the video content to the counterpart devices 2041 and 2042. The device 1000 may transmit information about current displaying location of the video content displayed on the screen thereof to the counterpart devices 2041 and 2042. Therefore, video content that is the same as the video content displayed on the screen of the device 1000 may be respectively displayed on screens of the counterpart devices 2041 and 2042 included in the Group 4.

Figure 19:
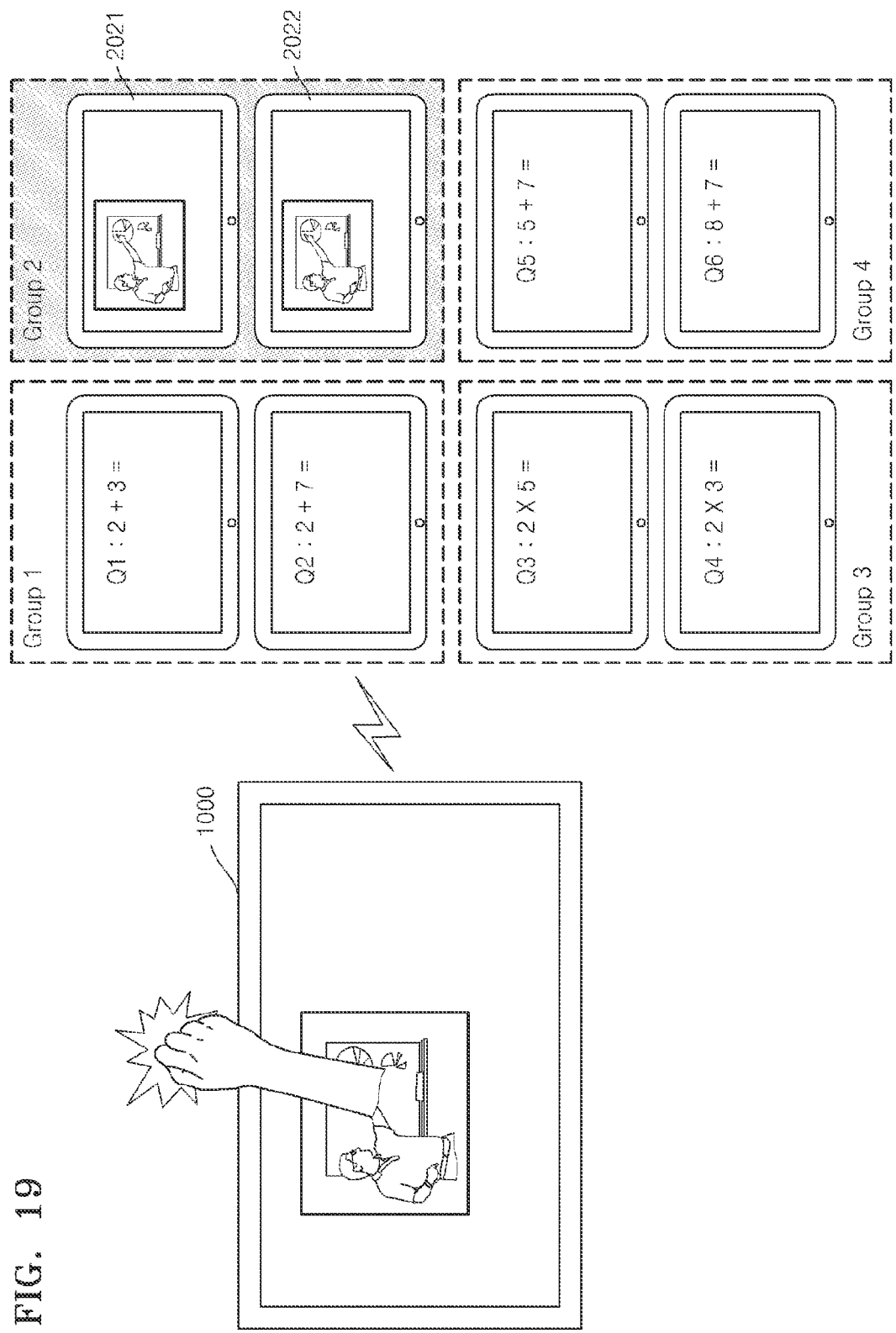
FIGS. 19 and 20 are diagrams illustrating examples of determining a counterpart device with which to share an object based on a knocking input to a periphery of a device according to various embodiments of the present disclosure.
Figure 20:
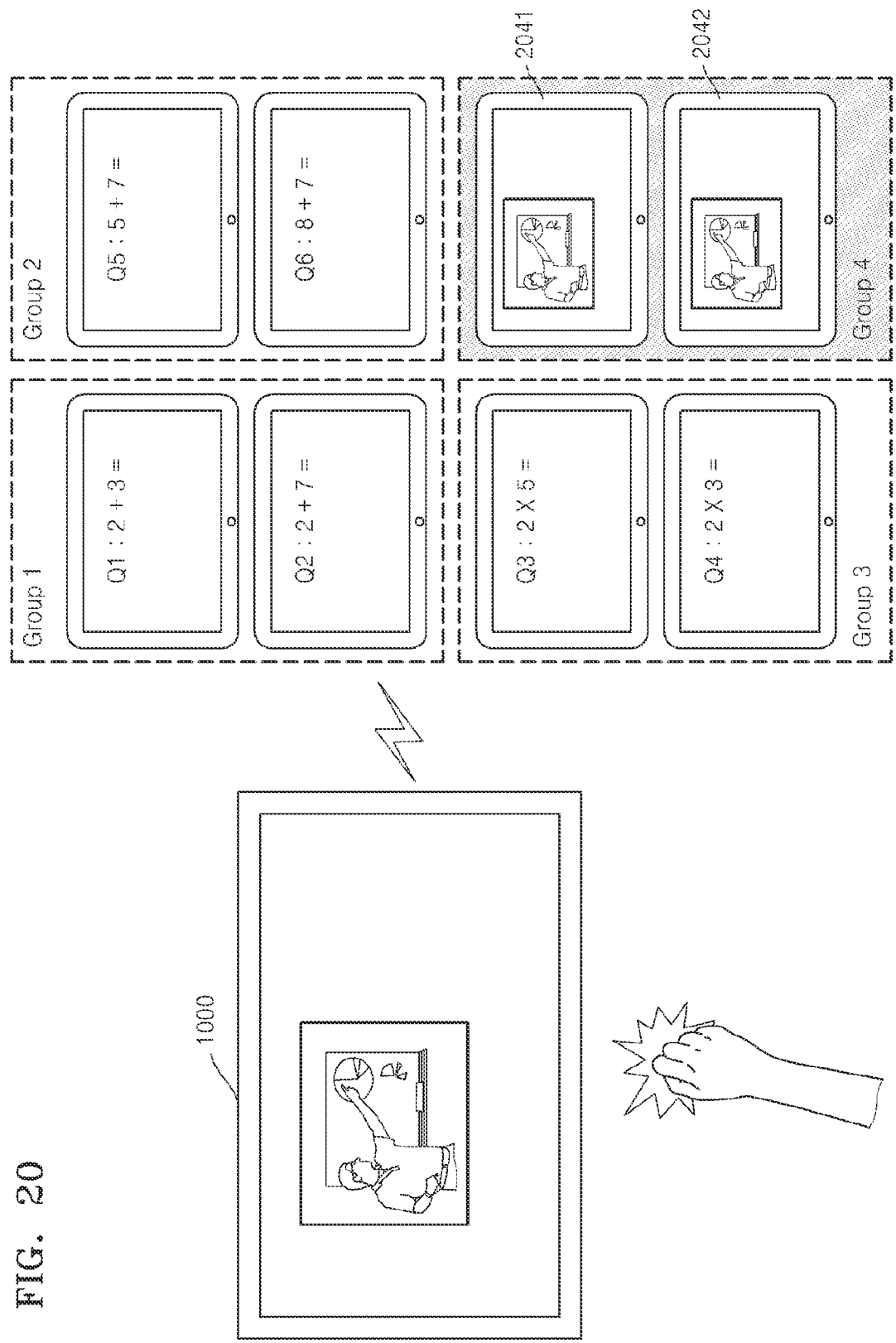

FIGS. 19 and 20 are diagrams illustrating an example of determining a counterpart device to share the object based on a knocking input on peripheral regions around the device 1000, according to the embodiment of the present disclosure.

Referring to FIGS. 19 and 20, peripheral regions of the device 1000 installed on a wall surface may be respectively matched with a plurality of device groups. For example, a left peripheral region of the device 1000 may be matched with 'Group 1', and an upper peripheral region of the device 1000 may be matched with 'Group 2'. Also, a right peripheral region of the device 1000 may be matched with 'Group 3', and a lower peripheral region of the device 1000 may be matched with 'Group 4'.

Referring to FIG. 19, the user may knock on the upper peripheral region of the device 1000. Accordingly, the device 1000 may share and synchronize video content displayed on the screen of the device 1000 with counterpart devices 2021 and 2022 included in the Group 2. In this case, the device 1000 may transmit one of a name of the video content displayed on the screen thereof, link information for downloading the video content, and the video content to the counterpart devices 2021 and 2022. The device 1000 may transmit information about current displaying location of the video content displayed on the screen thereof to the counterpart devices 2021 and 2022. Therefore, video content that is the same as the video content displayed on the screen of the device 1000 may be respectively displayed on screens of the counterpart devices 2021 and 2022 included in the Group 2.

In addition, referring to FIG. 20, the user may knock on the lower peripheral region of the device 1000. Accordingly, the device 1000 may share and synchronize a video content displayed on the screen of the device 1000 with counterpart devices 2041 and 2042 included in the Group 4. In this case, the device 1000 may transmit one of a name of the video content displayed on the screen thereof, link information for downloading the video content, and the video content to the counterpart devices 2041 and 2042. The device 1000 may transmit information about current displaying location of the video content displayed on the screen thereof to the counterpart devices 2041 and 2042. Therefore, video content that is the same as the video content displayed on the screen of the device 1000 may be respectively displayed on screens of the counterpart devices 2041 and 2042 included in the Group 4.

FIG. 21 is a diagram illustrating an example of determining a counterpart device to share the object based on a list of counterpart device groups displayed on the screen of the device 1000 according to an embodiment of the present disclosure.

Referring to FIG. 21, a list 20 of device groups may be displayed on the screen of the device 1000. In addition, the user may knock on a Group 4 included in the list 20 of the device groups. Accordingly, the device 1000 may share and synchronize a text "Q7:7+2*5=" that is displayed on the screen of the device 1000 with counterpart devices 2041 and 2042 included in the Group 4. Therefore, the text "Q7:7+2*5=" may be respectively displayed on screens of the counterpart devices 2041 and 2042 included in the Group 4.

Figure 22B:
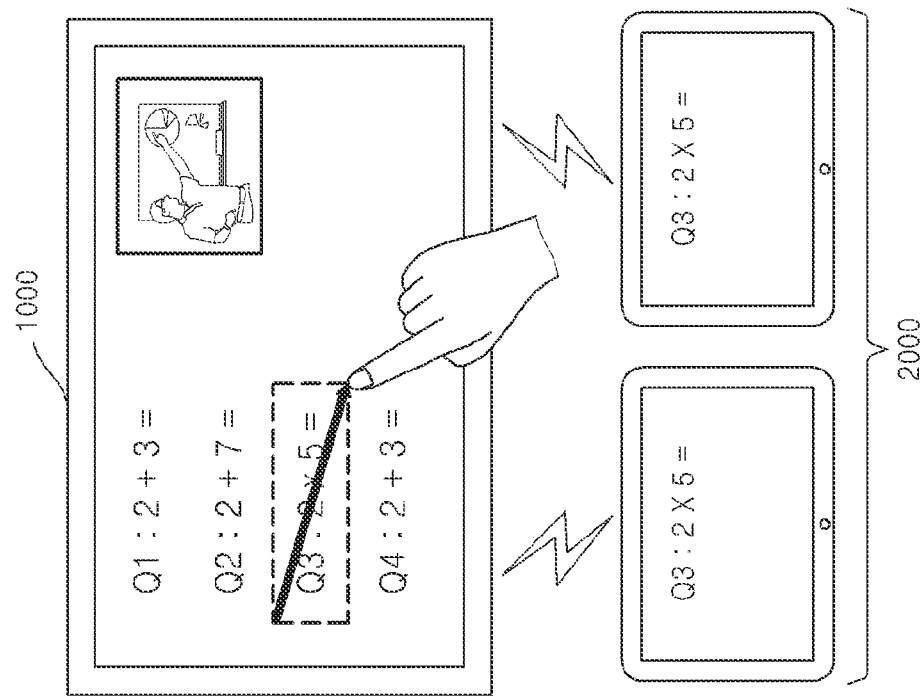
FIGS. 22A and 22B are diagrams illustrating an example of determining an object to be shared with a counterpart device based on a touch input after receiving a knocking input according to an embodiment of the present disclosure.
Figure 22A:
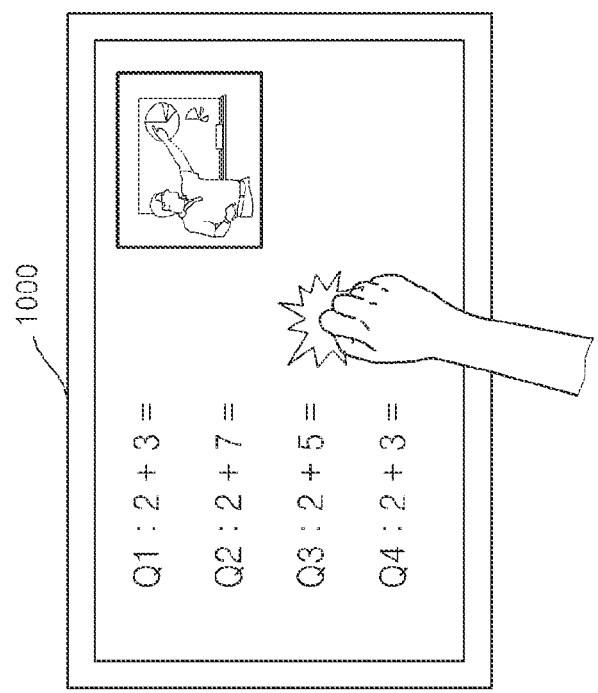

FIGS. 22A and 22B are diagrams illustrating an example of determining an object to be shared with a counterpart device based on a touch input after receiving a knocking input according to an embodiment of the present disclosure.

Referring to FIG. 22A, a plurality of objects (a text "Q1:2+3=", a text "Q2:2+7=", a text "Q4:2*3=", and a video content) may be displayed on the screen of the device 1000. In addition, the device 1000 may detect a knocking input of the user.

Referring to FIG. 22B, the device 1000 may receive a drag input of the user within a predetermined time after the detecting of the knocking input. Also, the device 1000 may determine the text "Q3:2*5=" as the object to be shared with the counterpart device 2000 based on the drag input of the user. Accordingly, the object "Q7:7+2*5=" may be synchronized between the device 1000 and the counterpart device 2000 may display the object.

Figure 23:
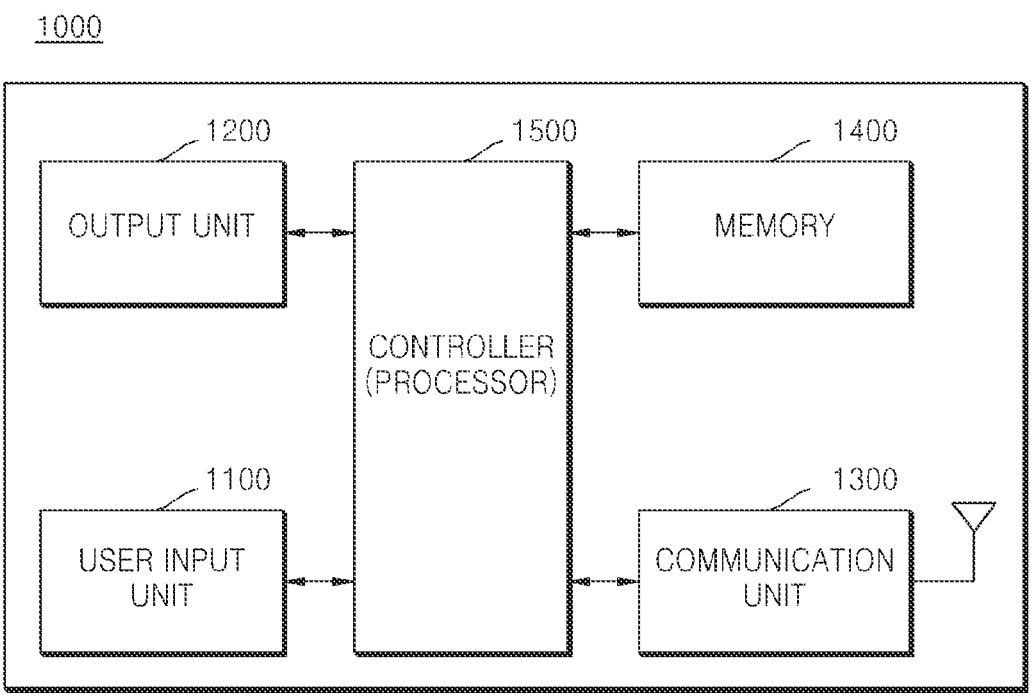
FIGS. 23 and 24 are block diagrams of a device according to an embodiment of the present disclosure.
Figure 24:
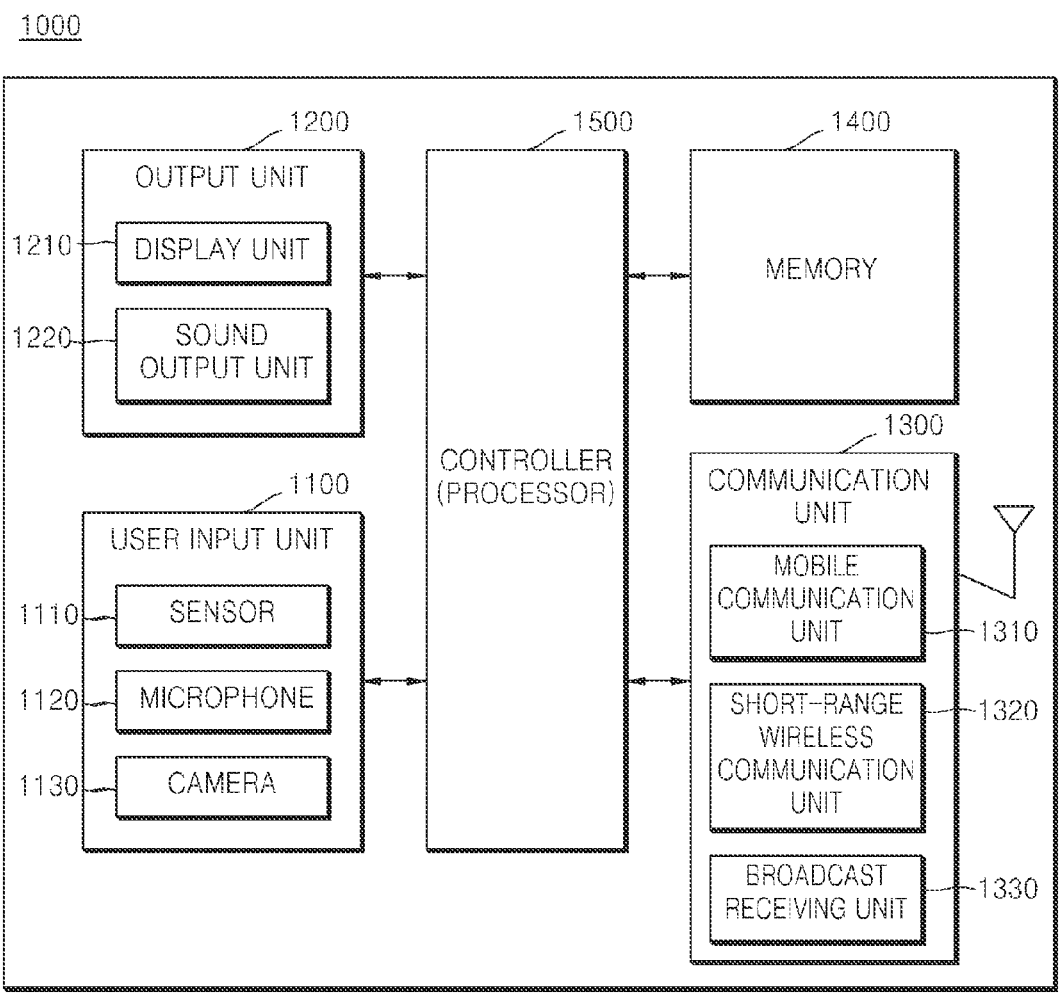

FIGS. 23 and 24 are block diagrams of the device 1000 according to an embodiment of the present disclosure.

Referring to FIG. 23, an electronic device 1000 according to the embodiment of the present disclosure may include a user input unit 1100, an output unit 1200, a communication unit 1300, a memory 1400, and a controller 1500. However, device 1000 is not limited thereto. The device 1000 may include more components than those of FIG. 23 or less components than those of FIG. 23.

Referring to FIG. 24, the user input unit 1100 detects a user input to the device 1000. The user input unit 1100 may include a sensor 1110, a microphone 1120, and a camera 1130. The user input unit 1100 may also include a keypad, a dome switch, a touch pad (a capacitive overlay type, a resistive overlay type, an infrared beam type, a surface acoustic wave type, an integral strain gauge type, and a piezoelectric type), a jog wheel, or a jog switch; however various embodiments of the present disclosure are not limited thereto.

The user input unit 1100 may detect a knocking input on the device 1000. The user input unit 1100 may detect the knocking input on the screen of the device 1000 and the knocking input on the bezel of the device 1000. The user input unit 1100 may detect the knocking input on the screen of the device 1000 by using the sensor 1110, the microphone 1120, and the camera 1130.

The user input unit 1100 may detect whether the screen of the device 1000 is knocked on by using, for example, the sensor 1110 having at least one of a touch sensor (not shown) and a pressure sensor (not shown) included in the screen of the device 1000. The device 1000 may detect whether the bezel of the device 1000 is knocked on by using, for example, the sensor 1110 having at least one of a touch sensor (not shown) and a pressure sensor (not shown) included in the bezel of the device 1000. In addition, the device 1000 may detect vibration generated when the device 1000 or the bezel of the device 1000 is knocked on, by using the sensor 1110 having a vibration sensor (not shown), for example. The device 1000 may detect sound generated when the device 1000 or the bezel of the device 1000 is knocked on, by using the microphone 1120, for example.

In addition, the device 1000 may detect the knocking input on a periphery of the device 1000 by using the sensor 1110, the microphone 1120, and the camera 1130. The device 1000 may detect vibration generated when the periphery of the device 1000 is knocked on, by using, for example, the vibration sensor. The device 1000 may detect sound generated when the periphery of the device 1000 is knocked on, by using, for example, the microphone.

The sensor 1110 may detect a status of the device 1000 or a peripheral status of the device 1000, and may transmit detected information to the controller 1500. The sensor 1110 may include at least one of a touch sensor, a pressure sensor, a vibration sensor, a magnetic sensor, an acceleration sensor, a temperature/humidity sensor, an infrared beam sensor, a gyroscope sensor, a positioning sensor (for example, a GPS sensor), an atmosphere sensor, and an RGB sensor (illuminance sensor), but is not limited thereto. Functions of each sensor may be intuitively inferred by one of ordinary skill in the art from their names, and thus, detailed descriptions of the sensors are omitted.

The microphone 1120 receives an external acoustic signal and processes the external acoustic signal as electric sound data. For example, the microphone 1120 may receive an acoustic signal from an external device or a speaker. The microphone 1120 may use various noise removal algorithms in order to eliminate noise generated while receiving the external acoustic signal.

Image frames processed by the camera 1130 may be stored in the memory 1400 or may be transmitted to the outside via the communication unit 1300. Two or more cameras may be included in the device 1000 according to a configuration of the device 1000.

The output unit 1200 outputs an audio signal or a video signal. The output unit 1200 may include a display unit 1210 and a sound output unit 1220.

The display unit 1210 displays information processed by the device 1000. The display unit 1210 may display a predetermined object. For example, if the device 1000 is an electronic blackboard, the display unit 1210 may display various objects that are related to education. The objects related to the education may include, for example, videos, images, and documents for teaching a predetermined educational topic, and may include a teacher's writings on the electronic blackboard.

In addition, if the display unit 1210 and a touch pad are configured as a touch screen in a layered structure, the display unit 1210 may be used as an input device, as well as the output device. The display unit 1210 may include at least one of a liquid crystal display (LCD), a thin film transistor liquid crystal display (TFT-LCD), an organic light-emitting diode (OLED) display, a flexible display, a 3D display, and an electrophoretic display. In addition, according to a configuration of the device 1000, the device 1000 may include two or more displays 1210. Here, the two or more displays 1210 may be disposed to face each other by using a hinge.

The sound output unit 1220 may output audio data transmitted from the communication unit 1300 or stored in the memory 1400. Also, the sound output unit 1220 may output sound signals that are related to functions performed by the device 1000 (for example, a call signal receiving sound, a message receiving sound, and a notification sound). The sound output unit 1220 may be a speaker, a buzzer, etc.

The controller 1500 controls overall operations of the device 1000. For example, the controller 1500 may execute programs stored in the memory 1400 to control the user input unit 1100, the output unit 1200, the communication unit 1300, and the memory 1400.

The controller 1500 analyzes the knocking input, determines an object displayed on the screen of the device 1000 based on an analyzing result, and determines a counterpart device 2000 to share the object. The controller 1500 controls the communication unit 1300 that will be described later to share and synchronize the determined object with the counterpart device 2000.

In particular, the controller 1500 may determine a pattern, intensity, and location of the knocking input. The pattern of the knocking input may be determined by, for example, the number of knocks and the knocking interval. The location of the knocking input may include, for example, a knocking location on the screen of the device, the location of the portion of the bezel that is knocked on, and a location of the peripheral region of the device, which is knocked on, but is not limited thereto.

The controller 1500 may determine an object to be shared with the counterpart device 2000 from among the objects displayed on the screen of the device 1000 based on at least one of the pattern, the intensity, and the location of the knocking input. For example, if the user knocks on the screen of the device 1000 with a force that is greater than a predetermined intensity or the user knocks on the screen of the device 1000 for a predetermined number of times or greater, the controller 1500 may determine that all the objects displayed on the screen of the device 1000 are to be shared with the counterpart device 2000. However, one or more embodiments are not limited thereto.

In addition, the controller 1500 may determine the counterpart device 2000 to share the object, based on at least one of the pattern, the intensity, and the location of the knocking input. The controller 1500 may determine to share the object with the counterpart device 2000 included in a device group corresponding to the knocked location. For example, if the user knocks on the lower bezel of the device 1000, the controller 1500 may determine to share the object with a counterpart device 2000 included in the Group 4. For example, if the user knocks on the upper bezel of the device 1000, the controller 1500 may determine to share the object with a counterpart device 2000 included in the Group 2. However, various embodiments of the present disclosure are not limited thereto.

Also, the controller 1500 may change screen control authority of the counterpart device 2000 based on at least one of the pattern, the force, and the location of the knocking input. For example, if the screen of the device 1000 is knocked on with a force that is equal to or greater than a predetermined value, control of the counterpart device 2000 by a user of the counterpart device 2000 may temporarily be disabled. For example, if the screen of the device 1000 is knocked on with a predetermined pattern of knocks, the screen of the counterpart device 2000 may be turned off However, various embodiments of the present disclosure are not limited thereto.

In addition, the controller 1500 controls the communication unit 1300 to share the object with the counterpart device 2000. The controller 1500 may transmit at least one of link information for downloading the determined object, the identification value of the determined object, and the determined object to the counterpart device 2000. In addition, the controller 1500 may transmit synchronization information about the determined object to the counterpart device 2000 in order to display the object that is synchronized with the device 1000 on the counterpart device 2000. The synchronization information may be used for displaying the object that is displayed on the screen of the device 1000 onto the screen of the counterpart device 2000 at the same time. For example, if the object is a text or an image, the synchronization information may include information about displayed location of the object on the screen of the device 1000 and information about a size of the region in which the object is displayed. In addition, if the object is a video, the synchronization information may include information about a current playback position of the video. However, various embodiments of the present disclosure are not limited thereto In a case where the controller 1500 transmits link information for downloading the determined object to the counterpart device 2000, the counterpart device 2000 may download or stream the determined object from the server 3000 by using the link information. If the controller 1500 transmits the object that is determined to be shared to the counterpart device 2000, the counterpart device 2000 may download or stream the object from the device 1000. In addition, if the controller 1500 transmits the identification value of the object to the counterpart device 2000, the counterpart device 2000 may acquire the object from the memory in the counterpart device 2000 or the server 3000 by using the identification value of the determined object and display the object.

The communication unit 1300 communicates with the counterpart device 2000 and the server 3000. The communication unit 1300 may include a mobile communication unit 1310, a short-range wireless communication unit 1320, and a broadcast receiving unit 1330.

If the user knocks on the peripheral region of the device 1000 by using an additional input device (not shown), the device 1000 may receive a knocking input signal transmitted from the input device (not shown) via the communication unit 1300. For example, the input device (not shown) may determine whether the wall surface around the device 1000 is knocked on by the input device (not shown) by using an internal sensor in the input device (not shown), and then, the input device (not shown) may transmit a knocking input signal to the communication unit 1300. Also, the communication unit 1300 may transmit the knocking input signal to the controller 1500.

The communication unit 1300 may transmit at least one of link information for downloading the object, the identification value of the object, and the object to the counterpart device 2000 under the control of the controller 1500. In addition, the communication unit 1300 is controlled by the controller 1500 to transmit synchronization information about the object to the counterpart device 2000 in order to display the object that is synchronized with the device 100 on the counterpart device 2000.

The mobile communication unit 1310 transmits/receives a wireless signal to/from at least one of a base station, an external terminal, and a server on a mobile communication network. Here, the wireless signal may include various types of data according to transmission/receipt of a voice call signal, a video call signal, or a text/multimedia message.

The short-range wireless communication unit 1320 may include a Bluetooth communication unit, a Bluetooth low energy (BLE) communication unit, a near field communication (NFC) unit, a wireless local area network (WLAN) communication unit, a ZigBee communication unit, an infrared data association (IrDA) communication unit, a Wi-Fi direct (WFD) communication unit, an ultra wideband (UWB) communication unit, or an Ant+communication unit; however, one or more embodiments of the present disclosure are not limited thereto.

The broadcast receiving unit 1330 may receive a broadcasting signal and/or information related to broadcasting from outside via a broadcasting channel. The broadcasting channel may include a satellite channel and a terrestrial broadcasting channel. The device 1000 may or may not include the broadcast receiving unit 1330.

The memory 1400 may store programs for processing and controlling the controller 1500, or may store input/output data. The memory 1400 may include at least one type of storage medium, such as a flash memory type, a hard disk type, a multimedia card micro type, a card type memory (for example, SD, XD memory, etc.), random access memory (RAM), static RAM (SRAM), read only memory (ROM), electronically erasable programmable ROM (EEPROM), programmable ROM (PROM), a magnetic memory, a magnetic disk, and an optical disk. Also, the device 1000 may manage a web storage or a cloud server performing a storage function of the memory 1400 on the Internet. The programs stored in the memory 1400 may be classified as a plurality of modules according to functions thereof.

The various embodiments of the disclosure may be written as computer programs in a recording medium including commands executable by a computer such as a program module executed by the computer. The computer readable recording medium is any medium accessed by the computer, volatile and non-volatile media, and detachable and non-detachable media. In addition, the computer readable recording medium may include a computer storage medium and a communication medium. The computer storage medium may include the volatile and non-volatile media, and the detachable and non-detachable media realized by any method or technologies for storing information such as a computer readable command, data structures, program modules, and other data. The communication medium typically includes computer readable commands, the data structures, the program module, or other data such as a modulated data signal, or other transmission mechanisms, and includes any information transfer medium.

It should be understood that the various embodiments described therein should be considered in a descriptive purpose only and not for purposes of limitation. Descriptions of features or aspects within each embodiment should typically be considered as available for other similar features or aspects in other various embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of sharing an object by using a device based on a knocking input, the method comprising:
   detecting a knocking input on the device;
   determining at least one object displayed on a screen of the device, based on the knocking input, and determining at least one counterpart device to transmit the at least one object with; and
   transmitting the at least one object to the at least one counterpart device,
   wherein the at least one object displayed on the screen of the device is also displayed on a screen of the at least one counterpart device after being transmitted, and
   wherein the determining of the at least one object comprises:
      detecting a touch input within a predetermined time period after the detecting of the knocking input, and
      determining at least one object to be transmitted to the at least one counterpart device based on the touch input within the predetermined time period.

2. The method of claim 1, further comprising:
   determining a pattern of the knocking input,
   wherein the transmitting of the at least one object comprises transmitting a control signal for sharing the at least one object from the device to the at least one counterpart device and synchronizing the at least one object based on the pattern of the knocking input.

3. The method of claim 2, wherein, when the pattern of the knocking input is a first pattern, the transmitting of the at least one object comprises transmitting a control signal for synchronizing the at least one object to the at least one counterpart device.

4. The method of claim 2, wherein, when the pattern of the knocking input is a second pattern, the transmitting of the at least one object comprises transmitting a control signal for synchronizing the at least one object and a control signal which causes the at least one counterpart device to output a predetermined notification sound.

5. The method of claim 1, further comprising:
   determining an intensity of the knocking input,
   wherein a control authority of a screen of the at least one counterpart device to receive a user input to the at least one counterpart device is changed according to the intensity of the knocking input.

6. The method of claim 5, wherein, when the intensity of the knocking input is a first certain value or greater, the transmitting of the at least one object comprises transmitting to the at least one counterpart device a control signal for suspending a screen control of the at least one counterpart device for suspending user input to the at least one counterpart device for a predetermined time period.

7. The method of claim 5, wherein, when the intensity of the knocking input is a second certain value or greater, the transmitting of the at least one object comprises transmitting to the at least one counterpart device a control signal which causes the at least one counterpart device to output a predetermined notification sound.

8. The method of claim 5, wherein, when the intensity of the knocking input is a third certain value or greater, the transmitting of the at least one object comprises transmitting to the at least one counterpart device from the device a control signal for deactivating a display function of the at least one counterpart device for a predetermined time period.

9. The method of claim 1, further comprising:
   determining a location of the knocking input,
   wherein the determining of the at least one counterpart device comprises determining at least one counterpart device included in a device group that corresponds to the location.

10. The method of claim 1, wherein the detecting of the knocking input comprises detecting the knocking input based on at least one of a pressure applied to the screen of the device by the knocking input, a pressure applied to a bezel of the device by the knocking input, a sound generated by the knocking input, and a vibration generated by the knocking input.

11. The method of claim 1, wherein the detecting of the knocking input comprises receiving a knocking input signal detected by a predetermined input device from the predetermined input device.

12. The method of claim 1, wherein the transmitting of the at least one object comprises transmitting at least one of link information for downloading the at least one object and the object to the at least one counterpart device.

13. The method of claim 1, wherein the transmitting of the at least one object comprises transmitting synchronization information for synchronizing the at least one object to the at least one counterpart device.

14. The method of claim 1, wherein content that is displayed on a screen of the at least one counterpart device is shared and synchronized with the device, based on a knocking input to the at least one counterpart device.

15. A non-transitory computer-readable recording medium having embodied thereon a program, which when executed by the computer, performs the method of claim 1.

16. A device for sharing an object based on a knocking input, the device comprising:
   a user input unit configured to detect the knocking input to the device;
   a display unit configured to display at least one object; and
   a controller configured to determine at least one object that is displayed on the display unit, based on the knocking input, to determine at least one counterpart device to which to transmit the at least one object, and to transmit the at least one object to the at least one counterpart device,
   wherein the determined at least one object is synchronized and displayed on a screen of the device and a screen of the at least one counterpart device,
   wherein the user input unit is further configured to detect a touch input for a predetermined time period after the detecting of the knocking input, and
   wherein the controller is further configured to determine at least one object to be transmitted to the at least one counterpart device based on the touch input detected within the predetermined time period.

17. The device of claim 16, wherein the controller is further configured to determine a pattern of the knocking input, and to transmit a control signal to the at least one counterpart device for sharing the at least one object and synchronizing the at least one object based on the pattern of the knocking input.

18. The device of claim 17, wherein, when the pattern of the knocking input is a first pattern, the controller is further configured to transmit a control signal for synchronizing the object to the at least one counterpart device.

19. The device of claim 17, wherein, when the pattern of the knocking input is a second pattern, the controller is further configured to transmit a control signal to synchronize the object and to transmit a control signal to instruct the at least one counterpart device to output a predetermined notification sound.

20. The device of claim 16, wherein the controller is further configured to determine an intensity of the knocking input, and to change a control authority of a screen of the at least one counterpart device to disable a user input to the at least one counterpart device according to the intensity of the knocking input.

21. The device of claim 20, wherein, when the intensity of the knocking input is a first certain value or greater, the controller is further configured to transmit to the at least one counterpart device a control signal to suspend a screen control of the at least one counterpart device and suspend user input to the at least one counterpart device for a predetermined time period.

22. The device of claim 20, wherein, when the intensity of the knocking input is a second certain value or greater, the controller is further configured to transmit to the at least one counterpart device a control signal which causes the at least one counterpart device to output a predetermined notification sound.

23. The device of claim 20, wherein, when the intensity of the knocking input is a third critical value or greater, the controller is further configured to transmit to the at least one counterpart device a control signal to deactivate a display function of the at least one counterpart device for a predetermined time period.

24. The device of claim 16, wherein the controller is further configured to determine a location of the knocking input, and to determine the at least one counterpart device included in a device group corresponding to the location of the knocking input.

25. The device of claim 16, wherein the user input unit is further configured to detect the knocking input based on at least one of a pressure applied to the screen of the device by the knocking input, a pressure applied to a bezel of the device by the knocking input, sound generated by the knocking input, and vibration generated by the knocking input.

26. The device of claim 16, further comprising a communication unit configured to receive a knocking input signal detected by an input device from the input device.

27. The device of claim 16, wherein the controller is further configured to transmit at least one of link information for downloading the at least one object and the object to the at least one counterpart device.

28. The device of claim 16, wherein the controller is further configured to transmit synchronization information for synchronizing the at least one object to the at least one counterpart device.

29. The device of claim 16, wherein content that is displayed on a screen of the at least one counterpart device is shared and synchronized with the device based on a knocking input to the at least one counterpart device.

* * * * *